US012726963B2

(12) United States Patent
Umeda et al.

(10) Patent No.: US 12,726,963 B2
(45) Date of Patent: Sep. 1, 2026

(54) RESOURCE ALLOCATION BASED ON DIRECT CURRENT LOCATION

(71) Applicant: Nokia Technologies Oy, Espoo (FI)

(72) Inventors: Hiromasa Umeda, Tokyo (JP); Petri Juhani Vasenkari, Espoo (FI); Toni Harri Henrikki Lähteensuo, Espoo (FI); Tero Henttonen, Espoo (FI)

(73) Assignee: Nokia Technologies Oy, Espoo (FI)

( * ) Notice: Subject to any disclaimer, the term of this patent is extended or adjusted under 35 U.S.C. 154(b) by 320 days.

(21) Appl. No.: 18/566,262

(22) PCT Filed: Aug. 13, 2021

(86) PCT No.: PCT/FI2021/050551
§ 371 (c)(1),
(2) Date: Dec. 1, 2023

(87) PCT Pub. No.: WO2022/254081
PCT Pub. Date: Dec. 8, 2022

(65) Prior Publication Data

US 2024/0260020 A1 Aug. 1, 2024

(30) Foreign Application Priority Data

Jun. 2, 2021 (WO) .................. PCT/FI2021/050406

(51) Int. Cl.
*H04W 72/0453* (2023.01)
*H04W 8/22* (2009.01)
(Continued)

(52) U.S. Cl.
CPC ......... *H04W 72/0453* (2013.01); *H04W 8/22* (2013.01); *H04W 52/146* (2013.01); *H04W 52/367* (2013.01)

(58) Field of Classification Search
CPC .. H04W 72/0453; H04W 52/146; H04W 8/22
See application file for complete search history.

(56) References Cited

U.S. PATENT DOCUMENTS 9,345,011 B2 5/2016 Lim et al.
10,348,434 B2 7/2019 Lim et al.
(Continued)

FOREIGN PATENT DOCUMENTS

WO 2019/199814 A1 10/2019
WO 2022/254078 A1 12/2022

OTHER PUBLICATIONS

Extended European Search Report received for corresponding European Patent Application No. 21943972.6, dated Apr. 9, 2025, 7 pages.
(Continued)

*Primary Examiner* — Ajay Cattungal
(74) *Attorney, Agent, or Firm* — Lippes Mathias LLP

(57) ABSTRACT

Disclosed is a method comprising receiving, from a terminal device, a message comprising at least an indication of a direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

18 Claims, 14 Drawing Sheets

(51) Int. Cl.
*H04W 52/14* (2009.01)
*H04W 52/36* (2009.01)

(56) References Cited

U.S. PATENT DOCUMENTS

| | | | | |
|---|---|---|---|---|
| 2019/0028219 | A1* | 1/2019 | Lim | H04B 17/309 |
| 2021/0029698 | A1 | 1/2021 | Lim et al. | |
| 2022/0224460 | A1* | 7/2022 | Lim | H04L 27/2601 |
| 2023/0078809 | A1* | 3/2023 | Lim | H04B 17/21 370/329 |
| 2023/0379998 | A1* | 11/2023 | Jung | H04W 76/20 |
| 2025/0063541 | A1* | 2/2025 | Vintola | H04W 64/003 |

OTHER PUBLICATIONS

"Consideration on direct current location signalling", 3GPP TSG-RAN WG2 Meeting #101bis, R2-1806191, Agenda item: 10.4.1.3.1.1, Qualcomm Incorporated, Apr. 16-20, 2018, pp. 1-2.

"Discussion on DC location Reporting", 3GPP TSG-RAN WG2 Meeting #113-e, R2-2100938, Agenda item: 6.15, vivo, Jan. 25-Feb. 5, 2021, 6 pages.

"3rd Generation Partnership Project; Technical Specification Group Radio Access Network; NR; User Equipment (UE) radio transmission and reception; Part 3: Range 1 and Range 2 Interworking operation with other radios (Release 17)", 3GPP TS 38.101-3, V17.1.0, Mar. 2021, pp. 1-716.

"3rd Generation Partnership Project, Technical Specification Group Radio Access Network; NR; User Equipment (UE) radio access capabilities (Release 16)", 3GPP TS 38.306, V16.4.0, Mar. 2021, pp. 1-151.

"3rd Generation Partnership Project; Technical Specification Group Radio Access Network; NR; Radio Resource Control (RRC) protocol specification (Release 16)", 3GPP TS 38.331, V16.4.1, Mar. 2021, pp. 1-949.

"3rd Generation Partnership Project; Technical Specification Group Radio Access Network; NR; User Equipment (UE) radio transmission and reception; Part 2: Range 2 Standalone (Release 17)", 3GPP TS 38.101-2, V17.1.0, Mar. 2021, pp. 1-189.

Peralta et al., "5G New Radio Base-Station Sensitivity and Performance", 15th International Symposium on Wireless Communication Systems (ISWCS), Aug. 28-31, 2018, 6 pages.

Iwasawa et al., "Effect of data channel multiplexing using symbol repetition considering asymmetric traffic load for full duplex", 19th International Symposium on Wireless Personal Multimedia Communications (WPMC), Nov. 14-16, 2016, pp. 172-176.

International Search Report and Written Opinion received for corresponding Patent Cooperation Treaty Application No. PCT/FI2021/050551, dated Feb. 4, 2022, 15 pages.

"3rd Generation Partnership Project; Technical Specification Group Radio Access Network; NR; User Equipment (UE) radio transmission and reception; Part 1: Range 1 Standalone (Release 17)", 3GPP TS 38.101-1, V17.1.0, Mar. 2021, pp. 1-512.

"R17 DC reporting for more than 2CCs", 3GPP TSG-RAN WG4 Meeting #99-e, R4-2110821, Agenda item: 9.4.6, OPPO, May 19-27, 2021, 4 pages.

"R17 BWs REFSENS", 3GPP TSG-RAN WG4 Meeting #99-e, R4-2111467, Agenda item: 8.27.2, Qualcomm Incorporated, May 19-27, 2021, pp. 1-5.

"Email discussion summary for RAN4#94be_#118_NR_RF_FR1_Part_1", 3GPP TSG-RAN WG4 Meeting #95-e, R4-2008948, Agenda item: 6.13.1, May 25-Jun. 5, 2020, 57 pages.

* cited by examiner

600

RESOURCE ALLOCATION BASED ON DIRECT CURRENT LOCATION

RELATED APPLICATION

This application is a National Stage entry from a PCT Application No. PCT/FI2021/050551, filed on Aug. 13, 2021 and PCT/FI2021/050406 filed on Jun. 2, 2021, each of which is incorporated herein by reference in its entirety.

FIELD

The following exemplary embodiments relate to wireless communication.

BACKGROUND

As resources are limited, it is desirable to optimize the usage of network resources. A cell in a cellular communication network may be utilized to enable better usage of resources and enhanced user experience to a user of a terminal device.

SUMMARY

The scope of protection sought for various exemplary embodiments is set out by the independent claims. The exemplary embodiments and features, if any, described in this specification that do not fall under the scope of the independent claims are to be interpreted as examples useful for understanding various exemplary embodiments.

According to an aspect, there is provided an apparatus comprising at least one processor, and at least one memory including computer program code, wherein the at least one memory and the computer program code are configured, with the at least one processor, to cause the apparatus to: receive, from a terminal device, a message comprising at least an indication of a direct current location associated with the terminal device; determine an effective channel bandwidth for uplink based at least partly on the direct current location associated with the terminal device; and determine, based at least partly on the effective channel bandwidth and a pre-defined condition, a maximum number of uplink resource blocks for fulfilling one or more reference sensitivity requirements of the terminal device.

According to another aspect, there is provided an apparatus comprising means for: receiving, from a terminal device, a message comprising at least an indication of a direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

According to another aspect, there is provided a method comprising: receiving, from a terminal device, a message comprising at least an indication of a direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

According to another aspect, there is provided a computer program comprising instructions for causing an apparatus to perform at least the following: receiving, from a terminal device, a message comprising at least an indication of a direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

According to another aspect, there is provided a computer program product comprising program instructions which, when run on a computing apparatus, cause the computing apparatus to perform at least the following: receiving, from a terminal device, a message comprising at least an indication of a direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

According to another aspect, there is provided a computer readable medium comprising program instructions for causing an apparatus to perform at least the following: receiving, from a terminal device, a message comprising at least an indication of a direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

According to another aspect, there is provided a non-transitory computer readable medium comprising program instructions for causing an apparatus to perform at least the following: receiving, from a terminal device, a message comprising at least an indication of a direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

According to another aspect, there is provided an apparatus comprising at least one processor, and at least one memory including computer program code, wherein the at least one memory and the computer program code are configured, with the at least one processor, to cause the apparatus to: indicate, to a network element of a wireless communication network, a capability for fulfilling one or more reference sensitivity requirements based at least partly on a pre-defined condition, wherein the capability is indicated by transmitting a first message, wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location; and transmit, to the network element, a second message comprising at least an indication of the direct current location.

According to another aspect, there is provided an apparatus comprising means for: indicating, to a network element of a wireless communication network, a capability for fulfilling one or more reference sensitivity requirements based at least partly on a pre-defined condition, wherein the capability is indicated by transmitting a first message, wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location; and transmitting, to the network element, a second message comprising at least an indication of the direct current location.

According to another aspect, there is provided a method comprising: indicating, to a network element of a wireless communication network, a capability for fulfilling one or more reference sensitivity requirements based at least partly on a pre-defined condition, wherein the capability is indicated by transmitting a first message, wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location; and transmitting, to the network element, a second message comprising at least an indication of the direct current location.

According to another aspect, there is provided a computer program comprising instructions for causing an apparatus to perform at least the following: indicating, to a network element of a wireless communication network, a capability for fulfilling one or more reference sensitivity requirements based at least partly on a pre-defined condition, wherein the capability is indicated by transmitting a first message, wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location; and transmitting, to the network element, a second message comprising at least an indication of the direct current location.

According to another aspect, there is provided a computer program product comprising program instructions which, when run on a computing apparatus, cause the computing apparatus to perform at least the following: indicating, to a network element of a wireless communication network, a capability for fulfilling one or more reference sensitivity requirements based at least partly on a pre-defined condition, wherein the capability is indicated by transmitting a first message, wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location; and transmitting, to the network element, a second message comprising at least an indication of the direct current location.

According to another aspect, there is provided a computer readable medium comprising program instructions for causing an apparatus to perform at least the following: indicating, to a network element of a wireless communication network, a capability for fulfilling one or more reference sensitivity requirements based at least partly on a pre-defined condition, wherein the capability is indicated by transmitting a first message, wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location; and transmitting, to the network element, a second message comprising at least an indication of the direct current location.

According to another aspect, there is provided a non-transitory computer readable medium comprising program instructions for causing an apparatus to perform at least the following: indicating, to a network element of a wireless communication network, a capability for fulfilling one or more reference sensitivity requirements based at least partly on a pre-defined condition, wherein the capability is indicated by transmitting a first message, wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location; and transmitting, to the network element, a second message comprising at least an indication of the direct current location.

According to another aspect, there is provided a system comprising at least a terminal device and a network element of a wireless communication network. The terminal device is configured to: transmit, to the network element, a message comprising at least an indication of a direct current location associated with the terminal device. The network element is configured to: receive, from the terminal device, the message comprising at least the indication of the direct current location associated with the terminal device; determine an effective channel bandwidth for uplink based at least partly on the direct current location associated with the terminal device; and determine, based at least partly on the effective channel bandwidth and a pre-defined condition, a maximum number of uplink resource blocks for fulfilling one or more reference sensitivity requirements of the terminal device.

According to another aspect, there is provided a system comprising at least a terminal device and a network element of a wireless communication network. The terminal device comprises means for: transmitting, to the network element, a message comprising at least an indication of a direct current location associated with the terminal device. The network element comprises means for: receiving, from the terminal device, the message comprising at least the indication of the direct current location associated with the terminal device; determining an effective channel bandwidth for uplink based at least partly on the direct current location associated with the terminal device; and determining, based at least partly on the effective channel bandwidth and a pre-defined condition, a maximum number of uplink resource blocks for fulfilling one or more reference sensitivity requirements of the terminal device.

BRIEF DESCRIPTION OF THE DRAWINGS

In the following, various exemplary embodiments will be described in greater detail with reference to the accompanying drawings, in which.

DETAILED DESCRIPTION

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

In the following, different exemplary embodiments will be described using, as an example of an access architecture to which the exemplary embodiments may be applied, a radio access architecture based on long term evolution advanced (LTE Advanced, LTE-A) or new radio (NR, 5G), without restricting the exemplary embodiments to such an architecture, however. It is obvious for a person skilled in the art that the exemplary embodiments may also be applied to other kinds of communications networks having suitable means by adjusting parameters and procedures appropriately. Some examples of other options for suitable systems may be the universal mobile telecommunications system (UMTS) radio access network (UTRAN or E-UTRAN), long term evolution (LTE, substantially the same as E-UTRA), wireless local area network (WLAN or Wi-Fi), worldwide interoperability for microwave access (WiMAX), Bluetooth®, personal communications services (PCS), ZigBee®, wideband code division multiple access (WCDMA), systems using ultra-wideband (UWB) technology, sensor networks, mobile ad-hoc networks (MANETs) and Internet Protocol multimedia subsystems (IMS) or any combination thereof.

Figure 1:
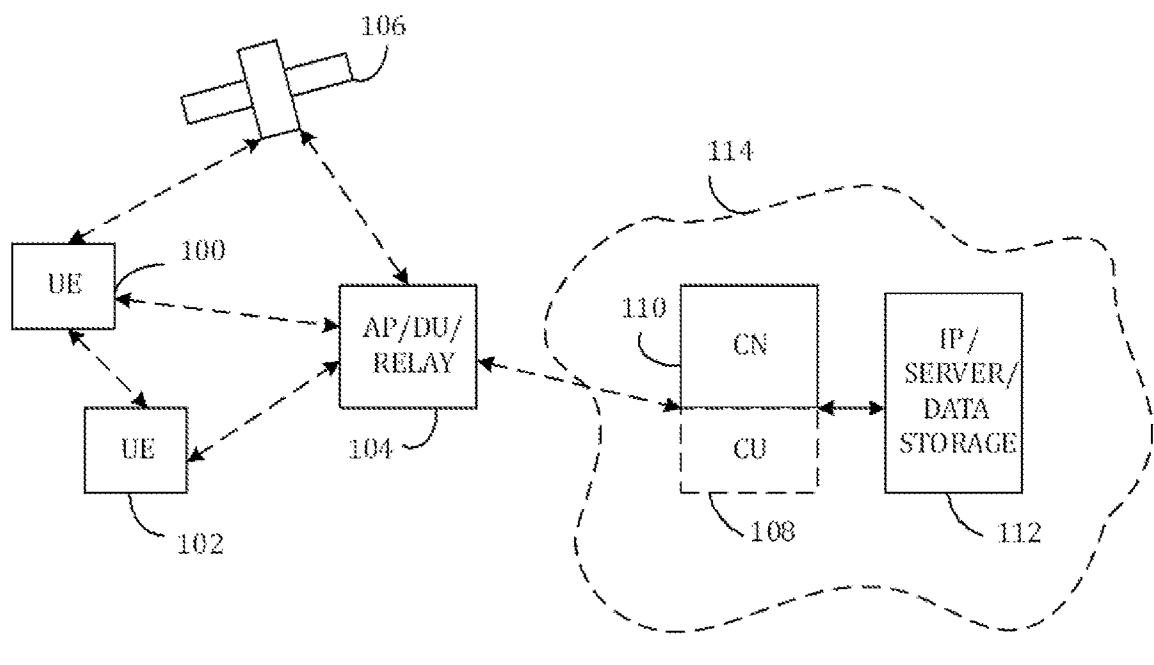
FIG. 1 illustrates an exemplary embodiment of a cellular communication network.

FIG. 1 depicts examples of simplified system architectures showing some elements and functional entities, all being logical units, whose implementation may differ from what is shown. The connections shown in FIG. 1 are logical connections; the actual physical connections may be different. It is apparent to a person skilled in the art that the system may also comprise other functions and structures than those shown in FIG. 1.

The exemplary embodiments are not, however, restricted to the system given as an example but a person skilled in the art may apply the solution to other communication systems provided with necessary properties.

The example of FIG. 1 shows a part of an exemplifying radio access network.

FIG. 1 shows user devices 100 and 102 configured to be in a wireless connection on one or more communication channels in a cell with an access node (such as (e/g)NodeB) 104 providing the cell. The physical link from a user device to a (e/g)NodeB may be called uplink or reverse link and the physical link from the (e/g)NodeB to the user device may be called downlink or forward link. It should be appreciated that (e/g)NodeBs or their functionalities may be implemented by using any node, host, server or access point etc. entity suitable for such a usage.

A communication system may comprise more than one (e/g)NodeB, in which case the (e/g)NodeBs may also be configured to communicate with one another over links, wired or wireless, designed for the purpose. These links may be used for signaling purposes. The (e/g)NodeB may be a computing device configured to control the radio resources of communication system it is coupled to. The (e/g)NodeB may also be referred to as a base station, an access point or any other type of interfacing device including a relay station capable of operating in a wireless environment. The (e/g)NodeB may include or be coupled to transceivers. From the transceivers of the (e/g)NodeB, a connection may be provided to an antenna unit that establishes bi-directional radio links to user devices. The antenna unit may comprise a plurality of antennas or antenna elements. The (e/g)NodeB may further be connected to core network 110 (CN or next generation core NGC). Depending on the system, the counterpart on the CN side may be a serving gateway (S-GW, routing and forwarding user data packets), packet data network gateway (P-GW), for providing connectivity of user devices (UEs) to external packet data networks, or mobile management entity (MME), etc.

The user device (also called UE, user equipment, user terminal, terminal device, etc.) illustrates one type of an apparatus to which resources on the air interface may be allocated and assigned, and thus any feature described herein with a user device may be implemented with a corresponding apparatus, such as a relay node. An example of such a relay node may be a layer 3 relay (self-backhauling relay) towards the base station. The self-backhauling relay node may also be called an integrated access and backhaul (IAB) node. The IAB node may comprise two logical parts: a mobile termination (MT) part, which takes care of the backhaul link(s) (i.e. link(s) between IAB node and a donor node, also known as a parent node) and a distributed unit (DU) part, which takes care of the access link(s), i.e. child link(s) between the IAB node and UE(s) and/or between the IAB node and other IAB nodes (multi-hop scenario).

The user device may refer to a portable computing device that includes wireless mobile communication devices operating with or without a subscriber identification module (SIM), including, but not limited to, the following types of devices: a mobile station (mobile phone), smartphone, personal digital assistant (PDA), handset, device using a wireless modem (alarm or measurement device, etc.), laptop and/or touch screen computer, tablet, game console, notebook, and multimedia device. It should be appreciated that a user device may also be a nearly exclusive uplink only device, of which an example may be a camera or video camera loading images or video clips to a network. A user device may also be a device having capability to operate in Internet of Things (IoT) network which is a scenario in which objects may be provided with the ability to transfer data over a network without requiring human-to-human or human-to-computer interaction. The user device may also utilize cloud. In some applications, a user device may comprise a small portable device with radio parts (such as a watch, earphones or eyeglasses) and the computation may be carried out in the cloud. The user device (or in some exemplary embodiments a layer 3 relay node) may be configured to perform one or more of user equipment functionalities. The user device may also be called a subscriber unit, mobile station, remote terminal, access terminal, user terminal, terminal device, or user equipment (UE) just to mention but a few names or apparatuses.

Various techniques described herein may also be applied to a cyber-physical system (CPS) (a system of collaborating computational elements controlling physical entities). CPS may enable the implementation and exploitation of massive amounts of interconnected ICT devices (sensors, actuators, processors microcontrollers, etc.) embedded in physical objects at different locations. Mobile cyber physical systems, in which the physical system in question may have inherent mobility, are a subcategory of cyber-physical systems. Examples of mobile physical systems include mobile robotics and electronics transported by humans or animals.

Additionally, although the apparatuses have been depicted as single entities, different units, processors and/or memory units (not all shown in FIG. 1) may be implemented.

5G enables using multiple input-multiple output (MIMO) antennas, many more base stations or nodes than the LTE (a so-called small cell concept), including macro sites operating in co-operation with smaller stations and employing a variety of radio technologies depending on service needs, use cases and/or spectrum available. 5G mobile communications may support a wide range of use cases and related applications including video streaming, augmented reality, different ways of data sharing and various forms of machine type applications (such as (massive) machine-type communications (mMTC), including vehicular safety, different sensors and real-time control. 5G may be expected to have multiple radio interfaces, namely below 6 GHz, cmWave and mmWave, and also being integrable with existing legacy radio access technologies, such as the LTE. Integration with the LTE may be implemented, at least in the early phase, as a system, where macro coverage may be provided by the LTE, and 5G radio interface access may come from small cells by aggregation to the LTE. In other words, 5G may support both inter-RAT operability (such as LTE-5G) and inter-RI operability (inter-radio interface operability, such as below 6 GHz-cmWave, below 6 GHz-cmWave-mmWave). One of the concepts considered to be used in 5G networks may be network slicing in which multiple independent and dedicated virtual sub-networks (network instances) may be created within the substantially same infrastructure to run services that have different requirements on latency, reliability, throughput and mobility.

The current architecture in LTE networks may be fully distributed in the radio and fully centralized in the core network. The low latency applications and services in 5G may need to bring the content close to the radio which leads to local break out and multi-access edge computing (MEC). 5G may enable analytics and knowledge generation to occur at the source of the data. This approach may need leveraging resources that may not be continuously connected to a network such as laptops, smartphones, tablets and sensors. MEC may provide a distributed computing environment for application and service hosting. It may also have the ability to store and process content in close proximity to cellular subscribers for faster response time. Edge computing may cover a wide range of technologies such as wireless sensor networks, mobile data acquisition, mobile signature analysis, cooperative distributed peer-to-peer ad hoc networking and processing also classifiable as local cloud/fog computing and grid/mesh computing, dew computing, mobile edge computing, cloudlet, distributed data storage and retrieval, autonomic self-healing networks, remote cloud services, augmented and virtual reality, data caching, Internet of Things (massive connectivity and/or latency critical), critical communications (autonomous vehicles, traffic safety, real-time analytics, time-critical control, healthcare applications).

The communication system may also be able to communicate with other networks, such as a public switched telephone network or the Internet 112, or utilize services provided by them. The communication network may also be able to support the usage of cloud services, for example at least part of core network operations may be carried out as a cloud service (this is depicted in FIG. 1 by "cloud" 114). The communication system may also comprise a central control entity, or a like, providing facilities for networks of different operators to cooperate for example in spectrum sharing.

Edge cloud may be brought into radio access network (RAN) by utilizing network function virtualization (NFV) and software defined networking (SDN). Using edge cloud may mean access node operations to be carried out, at least partly, in a server, host or node operationally coupled to a remote radio head (RRH) or a radio unit (RU), or a base station comprising radio parts. It may also be possible that node operations will be distributed among a plurality of servers, nodes or hosts. Carrying out the RAN real-time functions at the RAN side (in a distributed unit, DU 104) and non-real time functions in a centralized manner (in a central unit, CU 108) may be enabled for example by application of cloudRAN architecture.

It should also be understood that the distribution of labour between core network operations and base station operations may differ from that of the LTE or even be non-existent. Some other technology advancements that may be used may be Big Data and all-IP, which may change the way networks are being constructed and managed. 5G (or new radio, NR) networks may be designed to support multiple hierarchies, where MEC servers may be placed between the core and the base station or nodeB (gNB). It should be appreciated that MEC may be applied in 4G networks as well.

5G may also utilize satellite communication to enhance or complement the coverage of 5G service, for example by providing backhauling. Possible use cases may be providing service continuity for machine-to-machine (M2M) or Internet of Things (IoT) devices or for passengers on board of vehicles, or ensuring service availability for critical communications, and future railway/maritime/aeronautical communications. Satellite communication may utilize geostationary earth orbit (GEO) satellite systems, but also low earth orbit (LEO) satellite systems, in particular mega-constellations (systems in which hundreds of (nano)satellites are deployed). At least one satellite 106 in the mega-constellation may cover several satellite-enabled network entities that create on-ground cells. The on-ground cells may be created through an on-ground relay node 104 or by a gNB located on-ground or in a satellite.

It is obvious for a person skilled in the art that the depicted system is only an example of a part of a radio access system and in practice, the system may comprise a plurality of (e/g)NodeBs, the user device may have an access to a plurality of radio cells and the system may also comprise other apparatuses, such as physical layer relay nodes or other network elements, etc. At least one of the (e/g)NodeBs or may be a Home(e/g)nodeB.

Furthermore, the (e/g)nodeB or base station may also be split into: a radio unit (RU) comprising a radio transceiver (TRX), i.e. a transmitter (TX) and a receiver (RX); one or more distributed units (DUs) that may be used for the so-called Layer 1 (L1) processing and real-time Layer 2 (L2) processing; and a central unit (CU) or a centralized unit that may be used for non-real-time L2 and Layer 3 (L3) processing. The CU may be connected to the one or more DUs for example by using an F1 interface. Such a split may enable the centralization of CUs relative to the cell sites and DUs, whereas DUs may be more distributed and may even remain at cell sites. The CU and DU together may also be referred to as baseband or a baseband unit (BBU). The CU and DU may also be comprised in a radio access point (RAP).

The CU may be defined as a logical node hosting higher layer protocols, such as radio resource control (RRC), service data adaptation protocol (SDAP) and/or packet data convergence protocol (PDCP), of the (e/g)nodeB or base station. The DU may be defined as a logical node hosting radio link control (RLC), medium access control (MAC) and/or physical (PHY) layers of the (e/g)nodeB or base station. The operation of the DU may be at least partly controlled by the CU. The CU may comprise a control plane (CU-CP), which may be defined as a logical node hosting the RRC and the control plane part of the PDCP protocol of the CU for the (e/g)nodeB or base station. The CU may further comprise a user plane (CU-UP), which may be defined as a logical node hosting the user plane part of the PDCP protocol and the SDAP protocol of the CU for the (e/g)nodeB or base station.

Cloud computing platforms may also be used to run the CU and/or DU. The CU may run in a cloud computing platform, which may be referred to as a virtualized CU (vCU). In addition to the vCU, there may also be a virtualized DU (vDU) running in a cloud computing platform. Furthermore, there may also be a combination, where the DU may use so-called bare metal solutions, for example application-specific integrated circuit (ASIC) or customer-specific standard product (CSSP) system-on-a-chip (SoC) solutions. It should also be understood that the distribution of labour between the above-mentioned base station units, or different core network operations and base station operations, may differ.

Additionally, in a geographical area of a radio communication system, a plurality of different kinds of radio cells as well as a plurality of radio cells may be provided. Radio cells may be macro cells (or umbrella cells) which may be large cells having a diameter of up to tens of kilometers, or smaller cells such as micro-, femto- or picocells. The (e/g) NodeBs of FIG. 1 may provide any kind of these cells. A cellular radio system may be implemented as a multilayer network including several kinds of cells. In multilayer networks, one access node may provide one kind of a cell or cells, and thus a plurality of (e/g) NodeBs may be needed to provide such a network structure.

For fulfilling the need for improving the deployment and performance of communication systems, the concept of "plug-and-play" (e/g)NodeBs may be introduced. A network which may be able to use "plug-and-play" (e/g)NodeBs, may include, in addition to Home (e/g)NodeBs (H(e/g) nodeBs), a home node B gateway, or HNB-GW (not shown in FIG. 1). A HNB Gateway (HNB-GW), which may be installed within an operator's network, may aggregate traffic from a large number of HNBs back to a core network.

Many frequency-division duplexing (FDD) bands have been specified since LTE. Unlike time-division duplexing (TDD) bands, one of the noteworthy features of FDD systems is that FDD allows for UEs to conduct uplink (UL) signal transmission and downlink (DL) signal reception simultaneously. This makes a network scheduler for FDD even more flexible than that for TDD in time domain. One of the issues that FDD inherits, however, is that reference sensitivity (REFSENS) for FDD bands is not any better than that for TDD bands in almost all cases.

The reference sensitivity power level is the minimum mean power applied to each one of the UE antenna ports for all UE categories, at which the throughput shall meet or exceed the requirements for the specified reference measurement channel.

Hence, reference sensitivity indicates an ability of the UE to receive data with a given average throughput for a specified reference measurement channel, under conditions of a low signal level. This ability is originally related to DL coverage.

The reference sensitivity for FDD bands may be divided into two aspects. One aspect is the required reference sensitivity value as can be seen in Table 1 below, which presents examples of required reference sensitivity values for different channel bandwidths (CBW) ranging from 5 MHz to 50 MHz in NR band n7. For example, in Table 1, −98.0 dBm is the reference sensitivity value for 5 MHz CBW. The sensitivity value is mainly affected by noise figures of radio frequency (RF) front-end components, such as low-noise amplifier (LNA) noise figure, duplexer insertion loss, switch loss, loss due to printed circuit board (PCB), etc. This value is less affected by TX signal noise falling into the RX channel.

TABLE 1

| Band | SCS (kHz) | 5 MHz (dBm) | 10 MHz (dBm) | 15 MHz (dBm) | 20 MHz (dBm) | 25 MHz (dBm) | 30 MHz (dBm) | 40 MHz (dBm) | 50 MHz (dBm) | Duplex mode |
|---|---|---|---|---|---|---|---|---|---|---|
| n7 | 15 | −98.0 | −94.8 | −93.0 | −91.8 | −90.7 | −89.9 | −88.6 | −81.5 | FDD |

Figure 2:
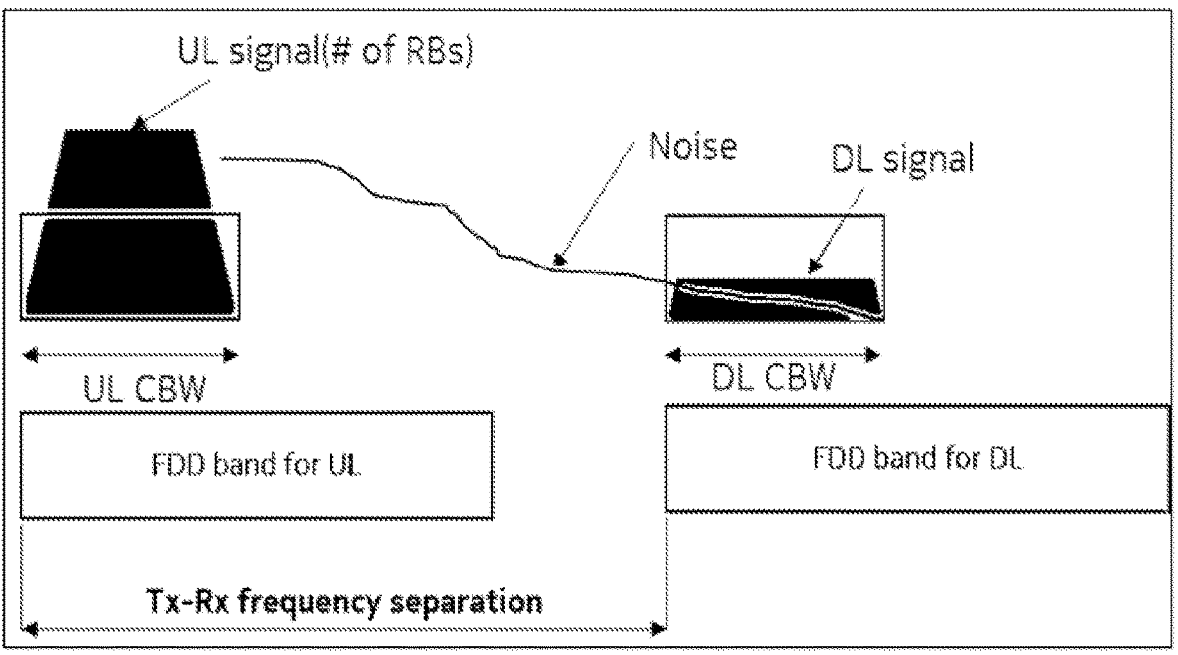
FIG. 2 illustrates an example of uplink noise impact on reference sensitivity.

The other aspect is the impact of TX noise falling into the RX channel during reception, as shown in FIG. 2. FIG. 2 illustrates an example 200 of UL noise impact on reference sensitivity. This phenomenon is specific to FDD, since there is no UL signal during reception in TDD. In the example of FIG. 2, it is expected that the noise level over DL channel bandwidth (CBW) increases, if the TX-RX frequency separation decreases.

Figure 3:
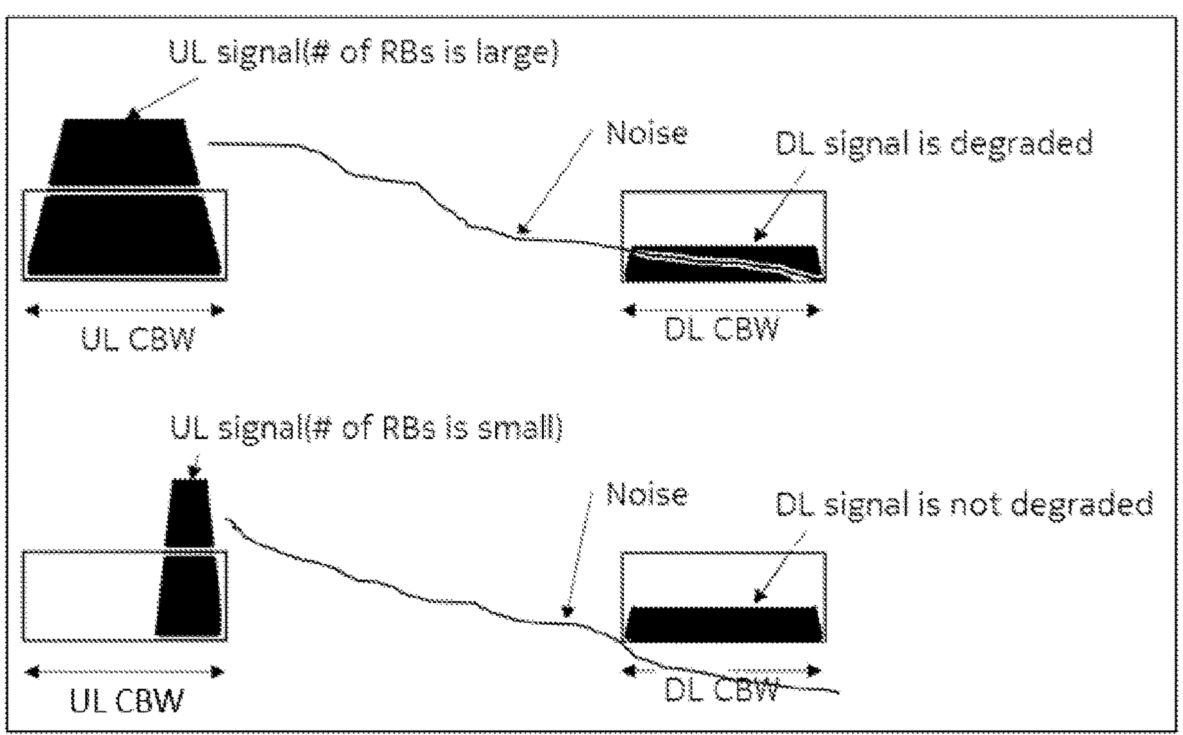
FIG. 3 illustrates an example of the impact of uplink transmission bandwidth configuration on reference sensitivity.

Another factor increasing the noise over DL CBW is uplink transmission bandwidth configuration (TBC), which may be equivalent to the number of resource blocks (RBs). FIG. 3 illustrates an example 300 of the impact of uplink TBC on reference sensitivity. As can be seen from FIG. 3, even with the same TX-RX frequency separation, a higher noise level can be seen over the DL CBW as the uplink TBC becomes wider.

Figure 4:
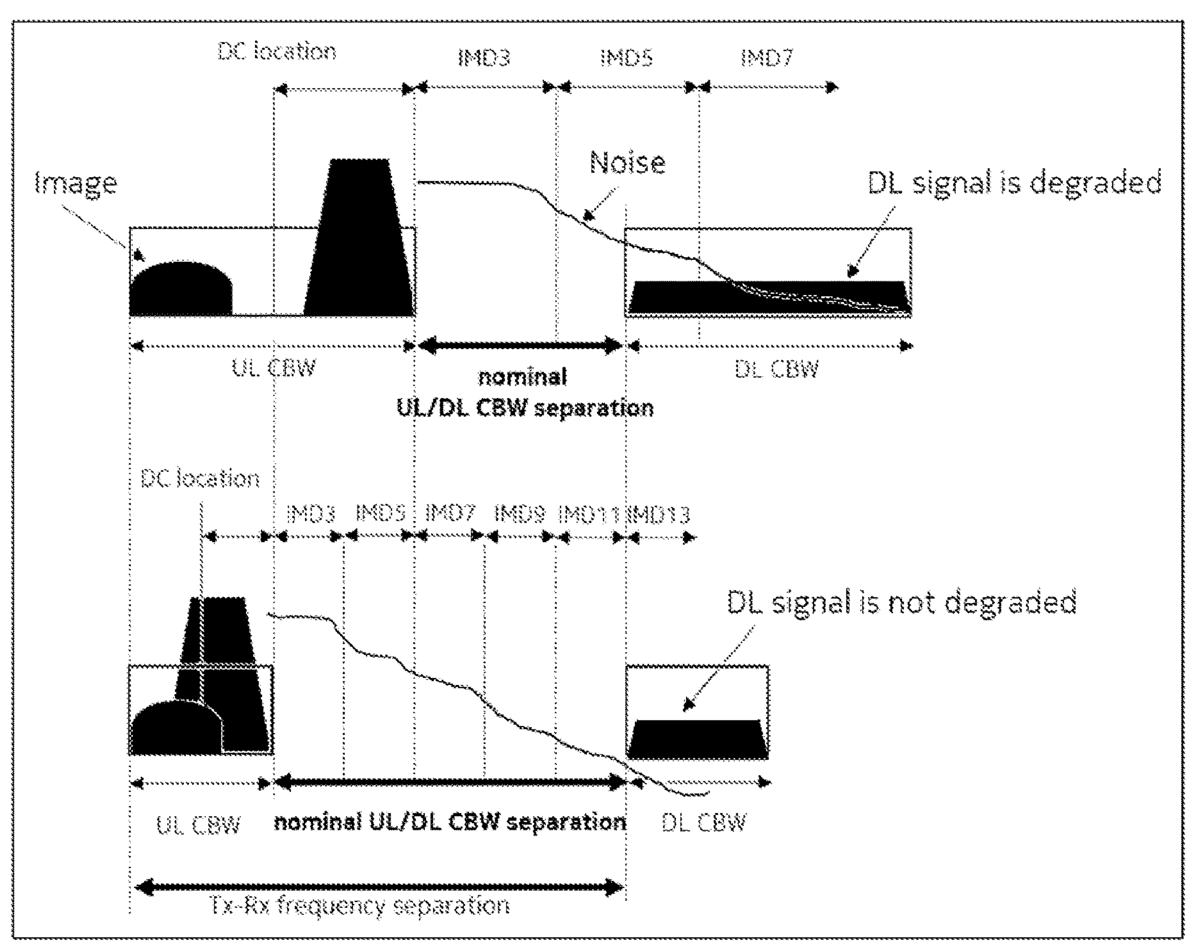
FIG. 4 illustrates an example of the impact of the channel bandwidth width and intermodulation due to direct current location, image, and transmit signal on downlink.

The last factor is the width of the CBW. FIG. 4 illustrates an example 400 of the impact of the CBW width and intermodulation (IMD) due to direct current (DC) location, image, and TX signal on DL. As can be seen in FIG. 4, the noise from UL over DL becomes higher as the CBW becomes wider.

This is because of two reasons. One is that, if UL CBW becomes wider as shown in the upper part of FIG. 4, lower order intermodulations such as IMD5 can reach the DL CBW, even if the TX-RX frequency separation is the same between the top and the bottom parts in FIG. 4. The other reason is that, if the CBW becomes wider, an effective UL/DL CBW separation (between the higher edge of the UL CBW and the lower edge of the DL CBW) becomes narrower. Hence, based on a consideration of all these factors, the reference sensitivity requirement for FDD bands has been specified in Table 1 above (which includes a part of Table 7.3.2-1 from TS 38.101-1), and it shall be met with an uplink TBC less than or equal to that specified in Table 2 below (which includes a part of Table 7.3.2-3 from TS 38.101-1). The values in the lower row of Table 2 indicate the maximum number of RBs, which can be transmitted safely in order to guarantee that the REFSENS requirement value from Table 1 for the corresponding CBW is fulfilled. In other words, if the number of UL RBs exceeds the number defined in Table 2 for the configured nominal CBW, then in some circumstances the REFSENS may degrade compared to the value defined in Table 1.

TABLE 2

| Band | SCS (kHz) | 5 MHz | 10 MHz | 15 MHz | 20 MHz | 25 MHz | 30 MHz | 40 MHz | 50 MHz | Duplex mode |
|---|---|---|---|---|---|---|---|---|---|---|
| n7 | 15 | 25 | 50 | 75 | 75 | 72 | 64 | 45 | 45 | FDD |

Table 3 below specifies the corresponding maximum transmission bandwidth configuration $N_{RB}$ according to Table 5.3.2-1 from TS 38.101-1. The values in the bottom row of Table 3 indicate the potential maximum number of RBs that can be used with the corresponding CBW without considering the REFSENS requirement. For example, for 50 MHz CBW in n7, the UE would be able to transmit 270 RBs (Table 3), but 45 RBs (Table 2) is the maximum number of RBs that guarantees that the REFSENS requirement (from Table 1) is fulfilled. From the network perspective, the network would have to allocate at most 45 UL RBs for the 50 MHz CBW case, because the UE may degrade its REFSENS if the network schedules more than 45 UL RBs in this case.

TABLE 3

| SCS (kHz) | 5 MHz $N_{RB}$ | 10 MHz $N_{RB}$ | 15 MHz $N_{RB}$ | 20 MHz $N_{RB}$ | 25 MHz $N_{RB}$ | 30 MHz $N_{RB}$ | 40 MHz $N_{RB}$ | 50 MHz $N_{RB}$ |
|---|---|---|---|---|---|---|---|---|
| 15 | 25 | 52 | 79 | 106 | 133 | 160 | 216 | 270 |

The above three tables indicate that, for NR band n7, the REFSENS requirement can be met with an almost full UL RB allocation for up to 15 MHz CBW, whereas for CBWs of more than 15 MHz the corresponding TBC (i.e. the number of UL RBs in Table 2) gradually decreases in comparison to the corresponding potential maximum number from Table 3.

Figure 5:
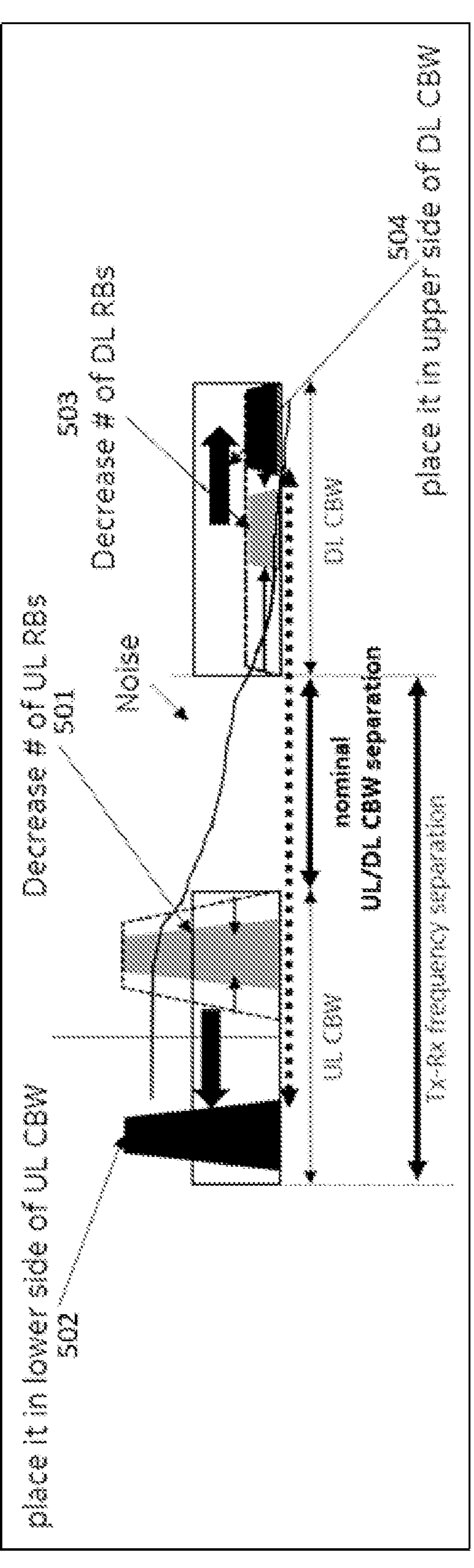
FIG. 5 illustrates techniques for resolving the reference sensitivity degradation issue at the network side.

FIG. 5 illustrates techniques for resolving the reference sensitivity degradation issue at the network side. In order to improve the reference sensitivity, the network could decrease 501 the number of UL RBs. Alternatively, the network could place 502 the UL RBs in the lower side of the UL CBW. As another alternative, the network could decrease 503 the number of DL RBs to less than what is necessary. As another alternative, the network could place 504 the DL RBs in the upper side of the DL CBW to extend the effective UL/DL CBW separation. However, these techniques are a huge burden in terms of DL as well as UL capacity.

The aforementioned issues may be resolved by increasing the power amplifier linearity at the UE, but this also increases power consumption. Thus, this may not be a practical solution, since battery life is a constraint in most UEs.

There are, however, UEs with less REFSENS degradation due to wider uplink TBC. As an example, such a UE may change its DC location closer to the center of the used (or to be used) UL bandwidth part (BWP). For this particular case, the impact of the IMD can be mitigated (see FIG. 4).

RAN4 has specified REFSENS (e.g. Table 1 and Table 2 above) under the assumption that the UL DC location of CBW is always at the center of the UL CBW, which is in general the worst-case assumption. However, if the network knows the actual DC location, then the network can calculate the impact of the IMD using a hypothetical effective UL CBW. If the UE meets the REFSENS requirement based on the derived effective UL CBW, then the network can allocate more UL RBs to the UE than specified e.g. in Table 2, thus improving the network performance. Some examples of one or more pre-defined rules for determining the effective UL CBW are presented in the following with reference to FIGS. 6 and 7.

Figure 6:
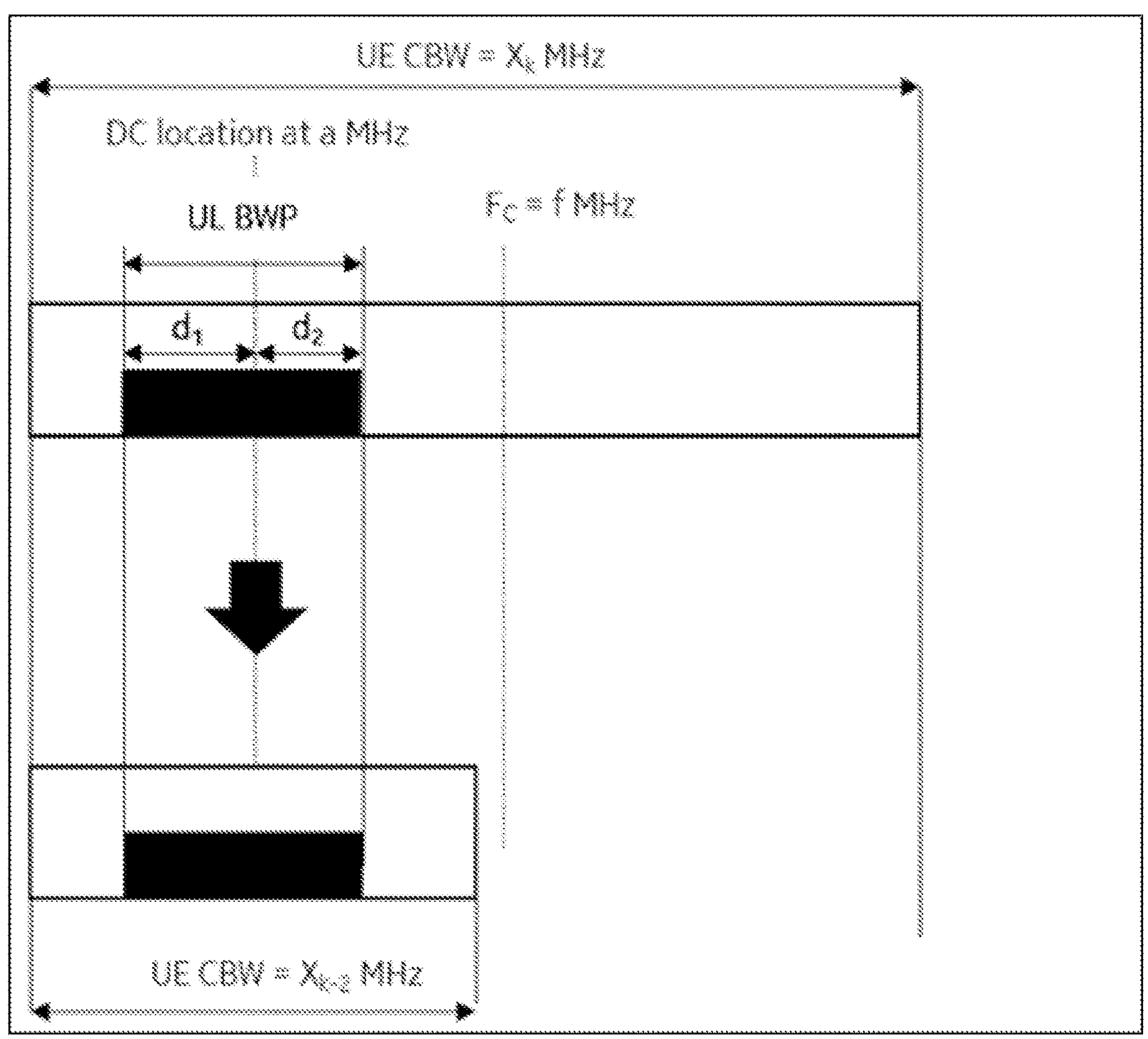
FIGS. 6 and 7 illustrate examples of determining effective uplink channel bandwidth based on direct current location.

FIG. 6 illustrates an example case 600 for determining the effective UL CBW according to an exemplary embodiment, wherein a UE CBW of $X_k$ MHz is replaced with an effective UL CBW of $X_{k-2}$ MHz. A UE supporting CBWs of $X_1, \ldots X_m$ is camping on a cell with $X_k$ MHz CBW. Note that $1<k\leq m$. The one or more pre-defined rules cause an apparatus such as a base station to perform the steps described in the following for determining the effective UL CBW. First, the larger one ($d_1$) of the distances $d_1$, $d_2$ between the DC location and the edges of the BWP is selected and multiplied by two, i.e. $2*\max(d_1, d_2)=2*d_1$. Then, CBWs greater than or equal to $2*d_1$ (i.e. $\geq 2*d_1$ or $>2*d_1$) are identified. For example, suppose that $X_k$, $X_{k-1}$, and $X_{k-2} \geq 2*d_1$. The smallest ($X_{k-2}$) of these identified CBWs may then be selected, i.e. $\min(X_k, X_{k-1}, X_{k-2})=X_{k-2}$. If $X_{k-2}$ is confined within the band, then $X_{k-2}$ MHz is the effective UL CBW, whose center frequency is a MHz (i.e. the DC location), instead of f MHz. In other words, the effective UL CBW is determined based on the smallest supported CBW identified (i.e. $X_{k-2}$). Larger distance may refer to longer distance herein. This may mean that the effective UL CBW equals to said identified smallest supported CBW (i.e. $X_{k-2}$).

Figure 7:
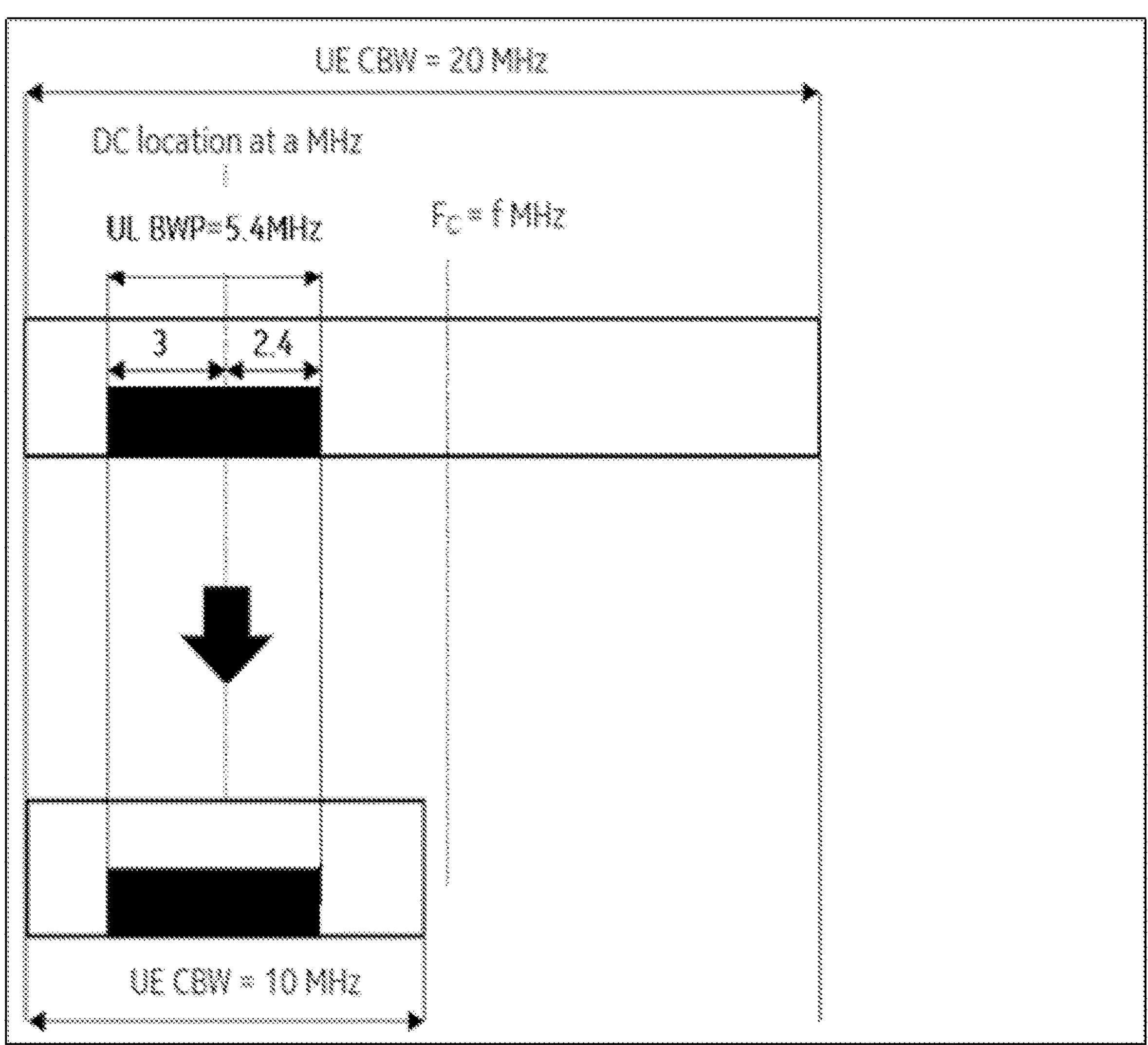

FIG. 7 illustrates another example case 700 for determining the effective UL CBW according to an exemplary embodiment, wherein a UE CBW of 20 MHz is replaced with an effective UL CBW of 10 MHz. In this example, an NR band supports 5, 10, 15, and 20 MHz CBW, and the UE is camping on a cell with 20 MHz CBW. The one or more pre-defined rules cause an apparatus such as a base station to perform the steps described in the following. The larger one ($d_1$=3 MHZ) of the distances (i.e. frequency differences) $d_1$, $d_2$ between the DC location and the edges of the BWP is selected and multiplied by two, i.e 2*max($d_1$, $d_2$)=2*max(3 MHZ, 2.4 MHz)=2*3 MHz=6 MHz. CBWs greater than or equal to 6 MHz are then identified. The identified CBWs are 10, 15, and 20 MHz. The smallest of the identified CBWs, i.e. 10 MHz, is selected. The 10 MHz CBW is confined within the band. Thus, 10 MHz is the effective UL CBW, whose center frequency is a MHz (i.e. the DC location), instead of f MHz.

The effective UL CBW for UL can provide a network with an insight that the noise due to IMD from UL into DL CBW is less than what is specified for a given CBW. It, however, does not consider the TX-RX frequency separation, which is illustrated in FIG. 4, for example. Hence, even if the effective CBW for UL is smaller than the configured nominal CBW, it cannot necessarily replace the configured nominal CBW in Table 2, if the TX-RX frequency separation is not considered. Herein nominal CBW may refer to a CBW defined in 3GPP specifications. There may be multiple nominal CBWs, and the UE may be configured with one nominal CBW for UL and one nominal CBW for DL at a time.

For example, suppose that a configured (i.e. currently used) nominal UE CBW is 50 MHz and a corresponding effective UL CBW is 20 MHz. However, the effective UL/DL CBW separation between the effective UL CBW (20 MHz) and the configured nominal DL CBW (50 MHz) is less than that for a nominal CBW separation of 20 MHz between the configured nominal UL CBW and the configured nominal DL CBW. Thus, 75 RBs for 20 MHz cannot be applied. This may occur, for example, if the effective CBW for UL is placed at the upper edge of the CBW closest to DL, as shown in the third example case 803 of FIG. 8.

Figure 8:
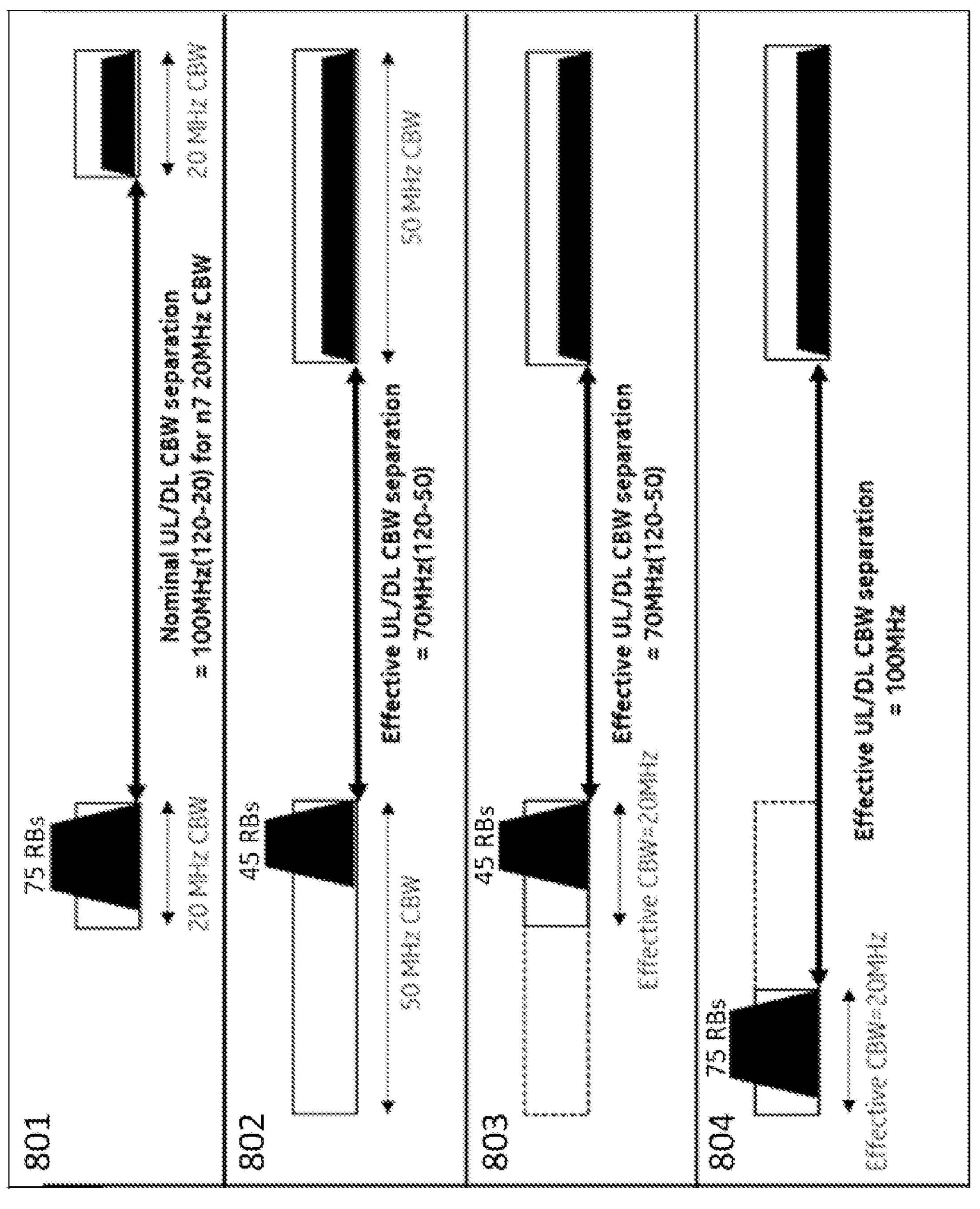
FIG. 8 illustrates the relation between effective uplink channel bandwidth and effective uplink/downlink channel bandwidth separation for n7.

FIG. 8 illustrates the relation between effective UL CBW and effective UL/DL CBW separation for n7. The first example case 801 illustrates a nominal case for 20 MHz CBW, wherein 75 RBs is the maximum allowed number of RBs for fulfilling the REFSENS requirement. The second example case 802 illustrates a nominal case for 50 MHz CBW, wherein 45 RBs is the maximum allowed number of RBs for fulfilling the REFSENS requirement. In the third example case 803, the effective UL CBW is 20 MHz, but it is placed at the upper edge. Thus, 75 RBs for 20 MHz cannot be used (i.e. 45 RBs is used instead), because the effective UL/DL CBW separation is less than the nominal UL/DL CBW separation in the first example case 801. In the fourth example case 804, the effective UL CBW is 20 MHz, and it is placed at the lower edge. Thus 75 RBs for 20 MHz can be used in this case without any degradation to REFSENS, since the effective UL/DL CBW separation is equal to the nominal UL/DL CBW separation in the first example case 801.

Some exemplary embodiments enable the network to determine, based on a pre-defined condition, the adequacy of the effective UL CBW for deriving the maximum number of UL RBs that can be allocated to a UE without degrading REFSENS at the UE. The pre-defined condition may be based on a nominal UL/DL CBW separation and an effective UL/DL CBW separation.

Figure 9:
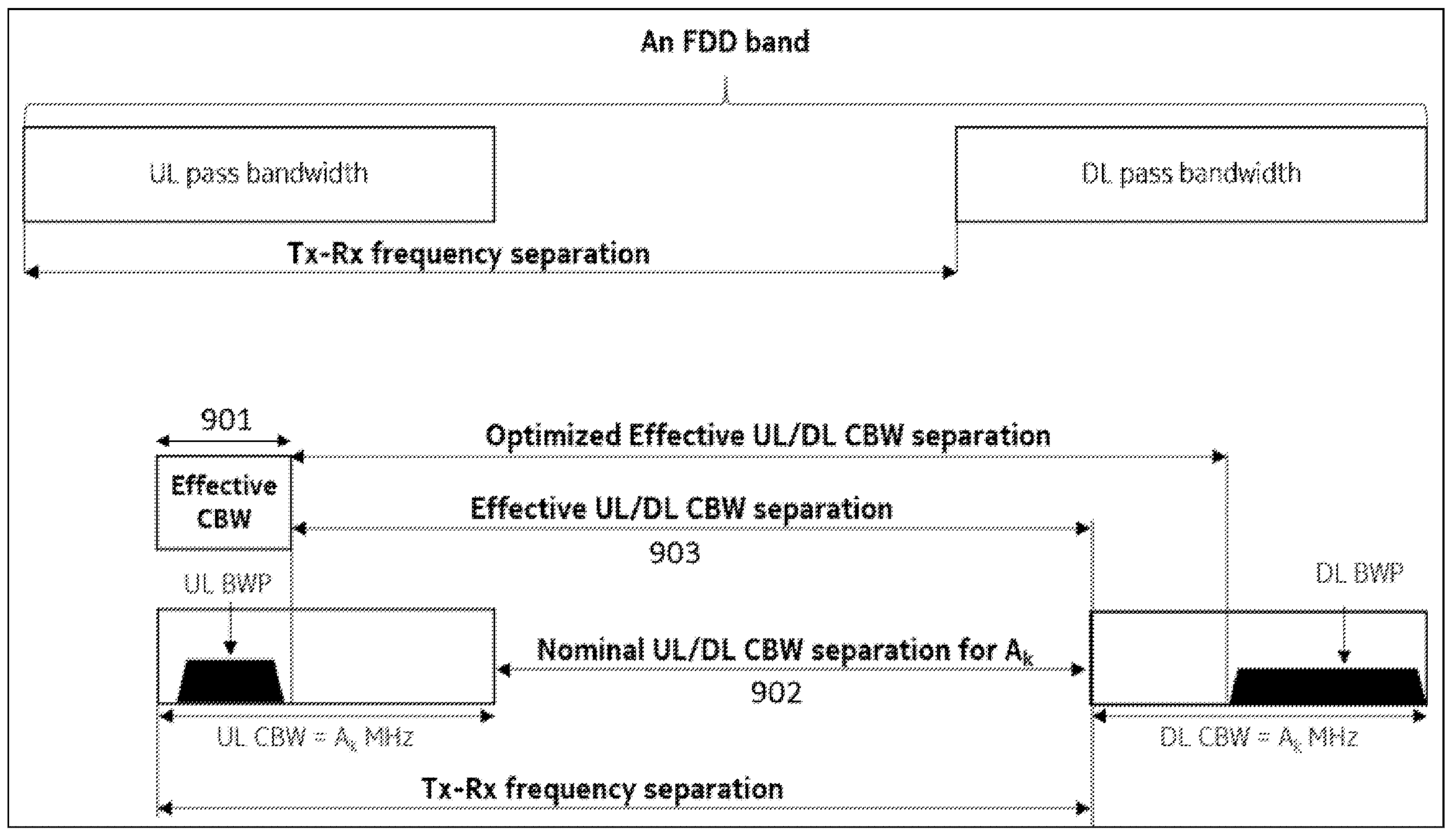
FIG. 9 illustrates the relationship between effective uplink channel bandwidth, nominal uplink/downlink channel bandwidth separation, and effective uplink/downlink channel bandwidth separation.

FIG. 9 illustrates the relationship between effective UL CBW 901, nominal UL/DL CBW separation 902, and effective UL/DL CBW separation 903.

The effective UL CBW 901 indicates IMD characteristics by UL DC location and an UL BWP of UE CBW. The effective UL CBW may be determined, or calculated, based at least partly on the DC location according to one or more pre-defined rules, for example as described above with reference to FIGS. 6 and 7.

The nominal UL/DL CBW separation 902 may be defined as the TX-RX frequency separation subtracted by the UE UL CBW. The nominal UL/DL CBW separation indicates how much separation distance between the closest edges of the configured nominal UL CBW and the configured nominal DL CBW is needed to avoid causing degradation on reference sensitivity over the UE DL CBW being used. The nominal UL/DL CBW separation is an operating-band-specific parameter, since the TX-RX frequency separation is different from band to band. Also, as can be seen from FIG. 9, the nominal UL/DL CBW separation is different from CBW to CBW even within the same band. As an example, the nominal UL/DL CBW separation for n7 is shown in Table 4 below.

TABLE 4

| | CBW | | | | | | | |
|---|---|---|---|---|---|---|---|---|
| | 5 MHz | 10 MHz | 15 MHz | 20 MHz | 25 MHz | 30 MHz | 40 MHz | 50 MHz |
| Nominal UL/DL CBW separation | 115 MHz | 110 MHz | 105 MHz | 100 MHz | 95 MHz | 90 MHz | 80 MHz | 70 MHz |

The effective UL/DL CBW separation 903 may be defined as the separation distance between the closest edges of effective UL CBW and configured nominal DL CBW. If the effective UL/DL CBW separation is larger than or equal to the nominal UL/DL CBW separation, then the effective UL CBW can be used to refer to the corresponding UE CBW in Table 2 for deriving the maximum number of UL RBs. However, if this condition is not fulfilled, then the effective UL CBW does not apply.

For instance, assume that the UE is using 50 MHz CBW and its effective UL CBW is 25 MHz with n7, and the effective UL/DL CBW separation is 95 MHz.

Since the effective UL/DL CBW separation for the effective UL CBW of 25 MHz is equal to the nominal UL/DL CBW separation, 50 MHz is replaced with 25 MHz when referring to Table 2. Hence, the network can allocate up to 72 RBs for the UL resource instead of being limited to 45 RBs.

It should be noted that the above example calculation is conducted assuming that the width of the DL BWP is equal to that of the UE DL CBW.

Another alternative for deriving the maximum number of UL RBs is described in the following. The difference to the previous alternative is the definition of the effective UL/DL CBW separation. In this case, the effective UL/DL CBW separation is defined as the separation distance between the closest edges of effective UL CBW and DL BWP. With this definition, a further optimized allocation of UL RBs and/or DL RBs becomes possible. For example, suppose that the effective UL CBW is 25 MHz, but the effective UL/DL CBW separation is 90 MHz. In this case, if the network allocates more than 45 RBs, the REFSENS may degrade. If, however, the optimized effective UL/DL CBW separation is 95 MHz by considering DL BWP, the network can still allocate up to 72 RBs for UL without any REFSENS degradation.

Figure 10:
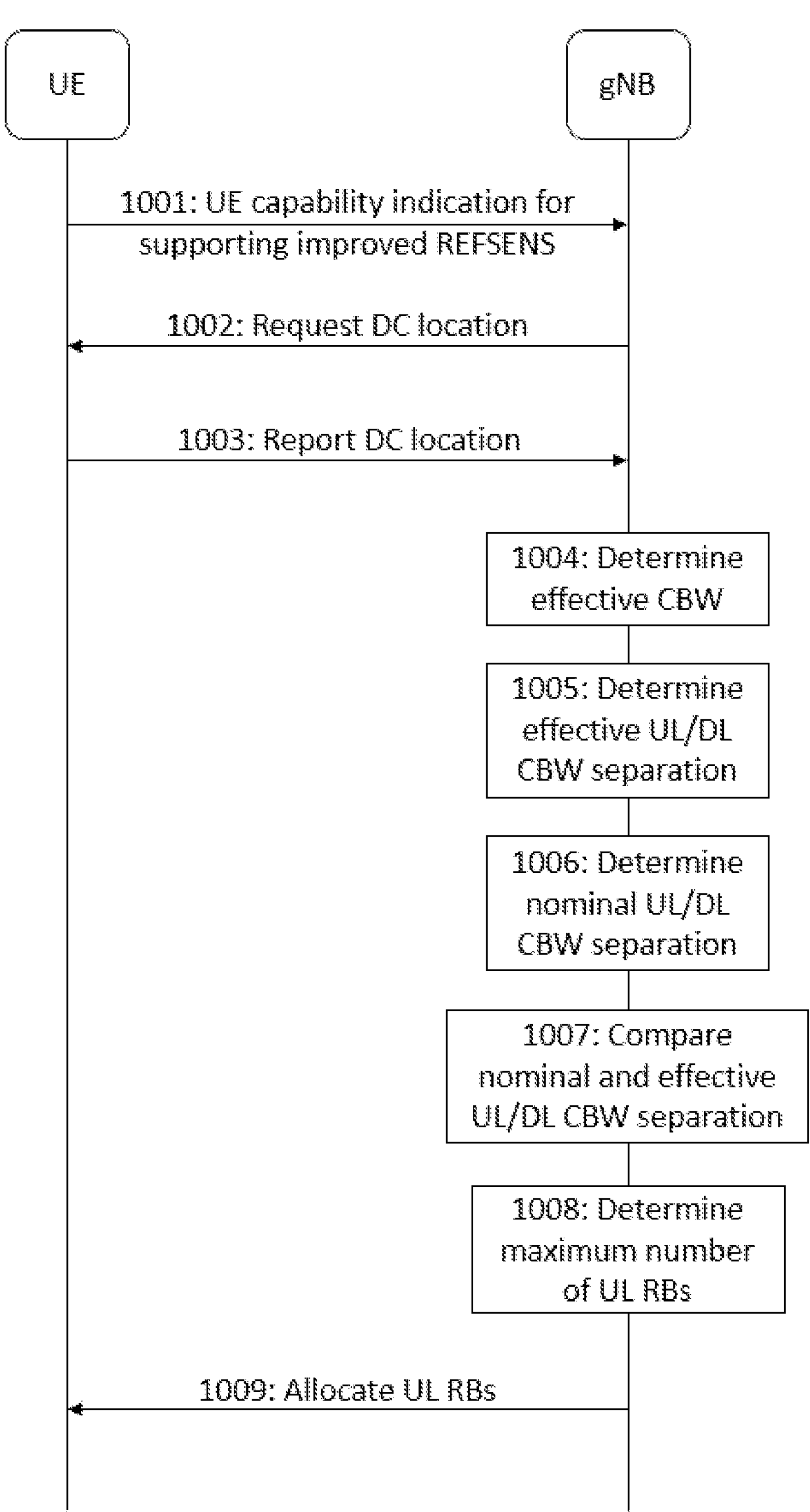
FIGS. 10-12 illustrate signaling diagrams according to some exemplary embodiments.

FIG. 10 illustrates a signaling diagram according to an exemplary embodiment. In this exemplary embodiment, a UE indicates whether it supports an improved REFSENS capability, and the network knows that the UE by default applies the capability to one or more bands or band combinations (BCs). Hence, the network determines the maximum number of UL RBs based on the capability indication and the DC location reported by the UE.

Referring to FIG. 10, the UE transmits 1001 a capability indication for supporting the improved REFSENS capability to a base station such as a gNB. In other words, the capability indication indicates that the UE is capable of fulfilling one or more pre-defined REFSENS requirements (e.g. as defined in Table 1 or in some other pre-defined table) based at least partly on a pre-defined condition. The pre-defined condition indicates whether or not the maximum number of UL RBs can be determined based on the effective UL/DL CBW separation and DC location.

The base station transmits 1002 a message, for example an RRC reconfiguration message, to the UE requesting the UE to report the DC location of the UE to the base station. The UE transmits 1003 a message, for example an RRC reconfiguration complete message, to the base station, wherein the message comprises the requested DC location report.

If the UE capability indication indicates the improved REFSENS capability, the base station determines 1004, or calculates, the effective UL CBW based at least partly on the reported DC location according to one or more pre-defined rules, for example as described above with reference to FIGS. 6 and 7.

The base station determines 1005, or calculates, an effective UL/DL CBW separation based on the effective UL CBW and the configured nominal DL CBW (i.e. the DL CBW currently used at the UE). The effective UL/DL CBW separation may be determined as a first separation distance between two closest edges of the effective UL CBW and the configured nominal DL CBW. For example, the two closest edges may mean the higher edge of the effective UL CBW and the lower edge of the configured nominal DL CBW. Alternatively, the effective UL/DL CBW separation may be determined as a first separation distance between two closest edges of the effective UL CBW and the DL BWP (for example in case the configured nominal DL CBW is not equal to the DL BWP). For example, in this case, the two closest edges may mean the higher edge of the effective UL CBW and the lower edge of the DL BWP.

The base station determines 1006, or calculates, a nominal UL/DL CBW separation based on the configured nominal DL CBW (i.e. the DL CBW currently used at the UE) and the configured nominal UL CBW. The nominal UL/DL CBW separation may be determined as a second separation distance between two closest edges of the configured nominal UL CBW and the configured nominal DL CBW. For example, the two closest edges may mean the higher edge of the configured nominal UL CBW and the lower edge of the configured nominal DL CBW.

The base station compares 1007 the nominal UL/DL CBW separation and the effective UL/DL CBW separation. Based on the comparing, the base station determines 1008 a maximum number of UL RBs (i.e. an uplink configuration) for fulfilling the one or more REFSENS requirements at the UE according to the pre-defined condition.

If the pre-defined condition is fulfilled, i.e. if the effective UL/DL CBW separation is larger than or equal to the nominal UL/DL CBW separation using the configured nominal UL/DL CBW, then the uplink configuration corresponding with the effective UL CBW is selected. In other words, the maximum number of UL RBs is determined based on the effective UL CBW instead of the configured nominal UL CBW, if the pre-defined condition is fulfilled. The uplink configuration may be selected, for example, from Table 2 or some other pre-defined table indicating uplink configurations for different CBWs.

If the pre-defined condition is not fulfilled, then the uplink configuration corresponding with the configured nominal UL CBW of the UE may be selected in order to ensure that there is no degradation to the REFSENS at the UE. In other words, the maximum number of UL RBs is determined based on the configured nominal UL CBW, if the pre-defined condition is not fulfilled.

The base station utilizes the determined maximum number of UL RBs in allocating 1009 a number of UL RBs to the UE. For example, the number of UL RBs allocated to the UE may be less than or equal to the determined maximum number of UL RBs. Thus, there is no degradation to REFSENS at the UE, since the determined maximum number of UL RBs is not exceeded. The allocated UL RBs may be indicated to the UE via configuration (e.g. configured grant) or via physical downlink control channel (PDCCH) in a dynamic allocation, for example.

Figure 11:
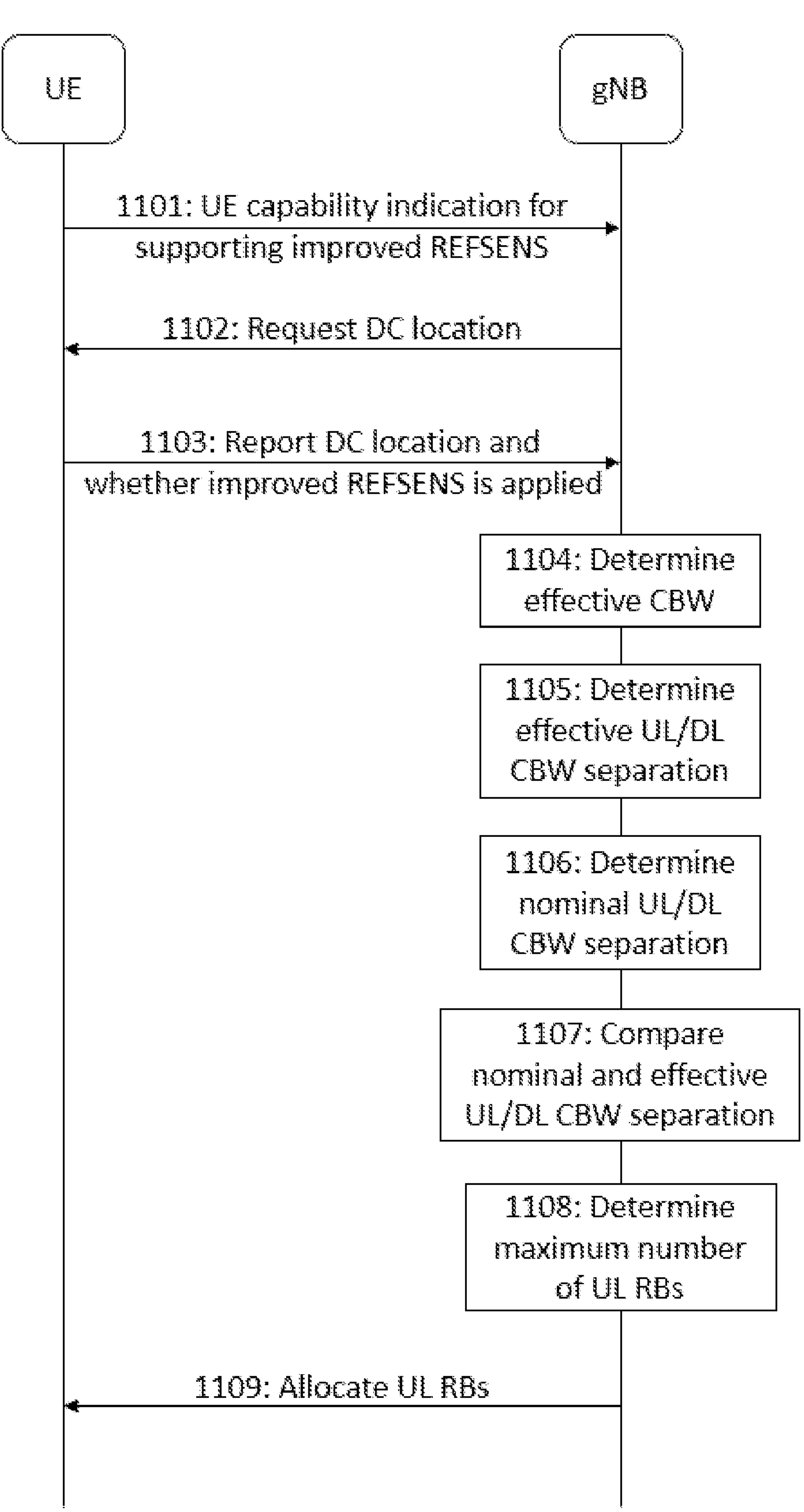

FIG. 11 illustrates a signaling diagram according to another exemplary embodiment. In this exemplary embodiment, the UE indicates to the network, in the DC location report, whether the improved REFSENS capability is applied or not. In other words, the improved REFSENS may not always be applied, depending on circumstances.

Referring to FIG. 11, the UE transmits 1101 a capability indication for supporting the improved REFSENS capability to a base station such as a gNB. In other words, the capability indication indicates that the UE is capable of fulfilling one or more pre-defined REFSENS requirements (e.g. as defined in Table 1 or in some other pre-defined table) based at least partly on a pre-defined condition. The pre-defined condition indicates whether or not the maximum number of UL RBs can be determined based on the effective UL CBW.

The base station transmits 1102 a message, for example an RRC reconfiguration message, to the UE requesting the UE to report the DC location of the UE to the base station. The UE transmits 1103 a message, for example an RRC reconfiguration complete message, to the base station, wherein the message comprises the requested DC location report as well as an indication indicating whether or not the improved REFSENS capability is applied.

If the indication indicates that the improved REFSENS capability is applied, the base station determines 1104, or calculates, the effective UL CBW based at least partly on the reported DC location according to one or more pre-defined rules, for example as described above with reference to FIGS. 6 and 7. The effective UL CBW may also referred to as a first channel bandwidth.

The base station determines 1105, or calculates, an effective UL/DL CBW separation based on the effective UL CBW and the configured nominal DL CBW (i.e. the DL CBW currently used at the UE). The effective UL/DL CBW separation may be determined as a first separation distance between two closest edges of the effective UL CBW and the configured nominal DL CBW. Alternatively, the effective UL/DL CBW separation may be determined as a first separation distance between two closest edges of the effective UL CBW and the DL BWP (for example in case the configured nominal DL CBW is not equal to the DL BWP).

The base station determines 1106, or calculates, a nominal UL/DL CBW separation based on the configured nominal DL CBW (i.e. the DL CBW currently used at the UE) and the configured nominal UL CBW. The nominal UL/DL CBW separation may be determined as a second separation distance between two closest edges of the configured nominal UL CBW and the configured nominal DL CBW The base station compares 1107 the nominal UL/DL CBW separation and the effective UL/DL CBW separation. Based on the comparing, the base station determines 1108 a maximum number of UL RBs (i.e. an uplink configuration) for fulfilling the one or more REFSENS requirements at the UE according to the pre-defined condition.

If the pre-defined condition is fulfilled, i.e. if the effective UL/DL CBW separation is larger than or equal to the nominal UL/DL CBW separation using the configured nominal UL/DL CBW, then the uplink configuration corresponding with the effective UL CBW may be selected. In other words, the maximum number of UL RBs is determined based on the effective UL CBW instead of the configured nominal UL CBW, if the pre-defined condition is fulfilled. The uplink configuration may be selected, for example, from Table 2 or some other pre-defined table indicating uplink configurations for different CBWs.

If the pre-defined condition is not fulfilled, then the uplink configuration corresponding with the configured nominal UL CBW of the UE is selected in order to ensure that there is no degradation to the REFSENS at the UE. In other words, the maximum number of UL RBs is determined based on the configured nominal UL CBW, if the pre-defined condition is not fulfilled.

The base station utilizes the determined maximum number of UL RBs in allocating 1109 a number of UL RBs to the UE. For example, the number of UL RBs allocated to the UE may be less than or equal to the determined maximum number of UL RBs. Thus, there is no degradation to REFSENS at the UE, since the determined maximum number of UL RBs is not exceeded. The allocated UL RBs may be indicated to the UE via configuration (e.g. configured grant) or via PDCCH in a dynamic allocation, for example.

Figure 12:
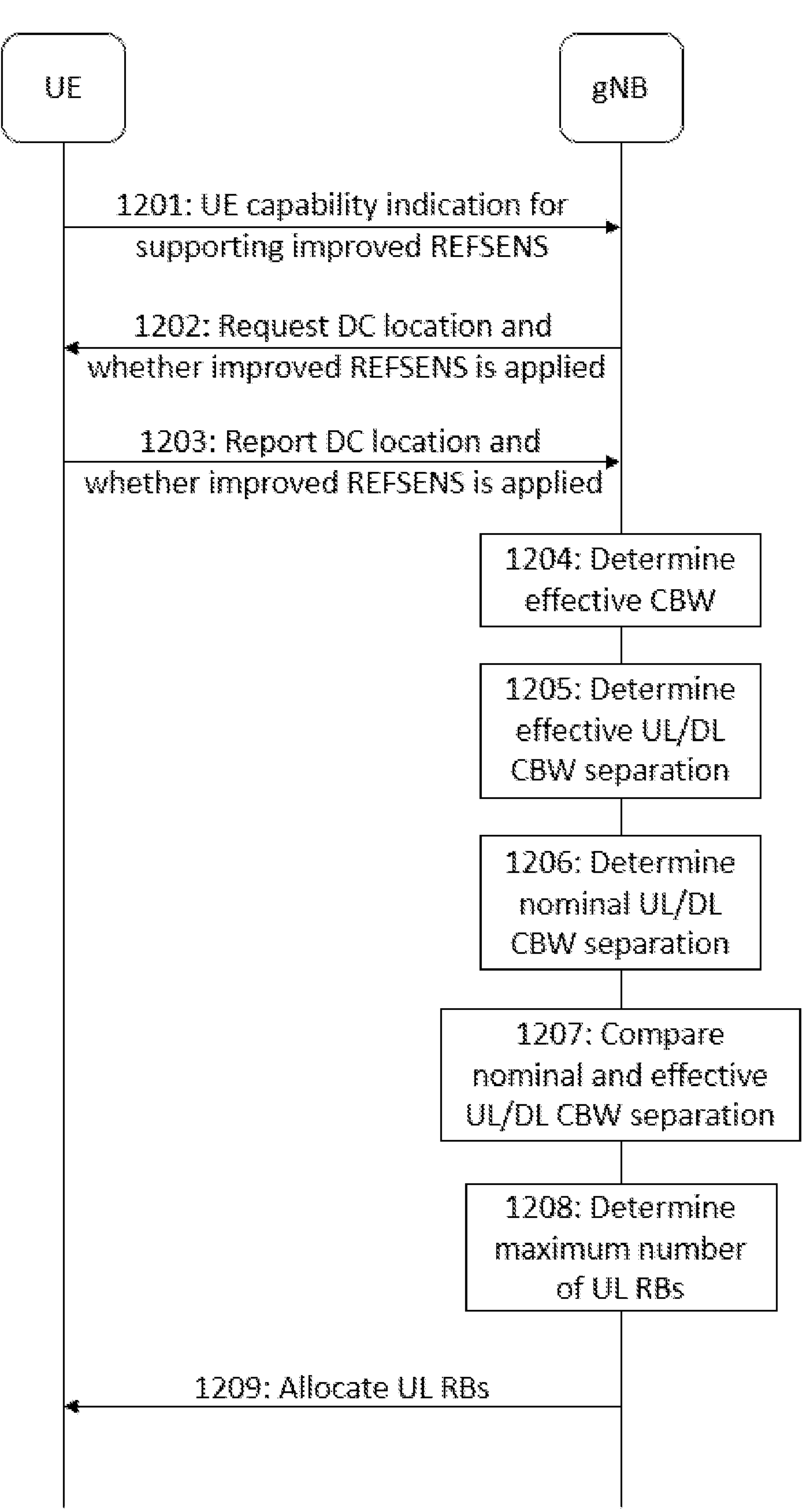

FIG. 12 illustrates a signaling diagram according to another exemplary embodiment. In this exemplary embodiment, the DC location request from the network also comprises a request to the UE for indicating whether the improved REFSENS can be applied or not. In response to the request, the UE then indicates to the network, in the DC location report, whether the improved REFSENS can be applied or not. In other words, the indication is not transmitted to the network unless the network requests it.

Referring to FIG. 12, the UE transmits 1201 a capability indication for supporting the improved REFSENS capability to a base station such as a gNB. In other words, the capability indication indicates that the UE is capable of fulfilling one or more pre-defined REFSENS requirements (e.g. as defined in Table 1 or in some other pre-defined table) based at least partly on a pre-defined condition. The pre-defined condition indicates whether or not the maximum number of UL RBs can be determined based on the effective UL CBW.

The base station transmits 1202 a message, for example an RRC reconfiguration message, to the UE requesting the UE to report the DC location of the UE as well as whether or not the improved REFSENS capability is applied. The UE transmits 1203 a message, for example an RRC reconfiguration complete message, to the base station, wherein the message comprises the requested DC location report as well as an indication indicating whether or not the improved REFSENS capability is applied.

If the indication indicates that the improved REFSENS capability is applied, the base station determines 1204, or calculates, the effective UL CBW based at least partly on the reported DC location according to one or more pre-defined rules, for example as described above with reference to FIGS. 6 and 7.

The base station determines 1205, or calculates, an effective UL/DL CBW separation based on the effective UL CBW and the configured nominal DL CBW (i.e. the DL CBW currently used at the UE). The effective UL/DL CBW separation may be determined as a first separation distance between two closest edges of the effective UL CBW and the configured nominal DL CBW. Alternatively, the effective UL/DL CBW separation may be determined as a first separation distance between two closest edges of the effective UL CBW and the DL BWP (for example in case the configured nominal DL CBW is not equal to the DL BWP).

The base station determines 1206, or calculates, a nominal UL/DL CBW separation based on the configured nominal DL CBW (i.e. the DL CBW currently used at the UE) and the configured nominal UL CBW. The nominal UL/DL CBW separation may be determined as a second separation distance between two closest edges of the configured nominal UL CBW and the configured nominal DL CBW The base station compares 1207 the nominal UL/DL CBW separation and the effective UL/DL CBW separation. Based on the comparing, the base station determines 1208 a maximum number of UL RBs (i.e. an uplink configuration) for fulfilling the one or more REFSENS requirements at the UE according to the pre-defined condition.

If the pre-defined condition is fulfilled, i.e. if the effective UL/DL CBW separation is larger than or equal to the nominal UL/DL CBW separation using the configured nominal UL/DL CBW, then the uplink configuration corresponding with the effective UL CBW may be selected. In other words, the maximum number of UL RBs is determined based on the effective UL CBW instead of the configured nominal UL CBW, if the pre-defined condition is fulfilled. The uplink configuration may be selected, for example, from Table 2 or some other pre-defined table indicating uplink configurations for different CBWs.

If the pre-defined condition is not fulfilled, then the uplink configuration corresponding with the configured nominal UL CBW of the UE is selected in order to ensure that there is no degradation to the REFSENS at the UE. In other words, the maximum number of UL RBs is determined based on the configured nominal UL CBW, if the pre-defined condition is not fulfilled.

The base station utilizes the determined maximum number of UL RBs in allocating 1209 a number of UL RBs to the UE. For example, the number of UL RBs allocated to the UE may be less than or equal to the determined maximum number of UL RBs. Thus, there is no degradation to REFSENS at the UE, since the determined maximum number of UL RBs is not exceeded. The allocated UL RBs may be indicated to the UE via configuration (e.g. configured grant) or via PDCCH in a dynamic allocation, for example.

Figure 13:
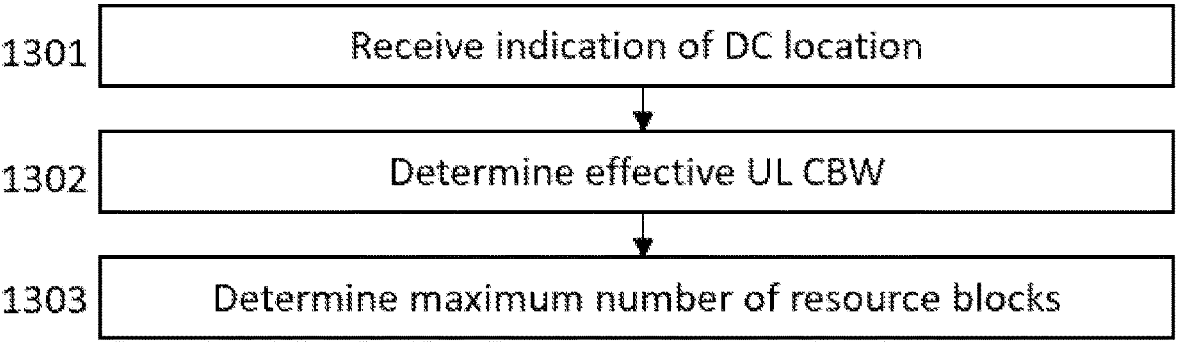
FIGS. 13-14 illustrate flow charts according to some exemplary embodiments.

FIG. 13 illustrates a flow chart according to an exemplary embodiment. The functions illustrated in FIG. 13 may be performed by an apparatus such as, or comprised in, a network element such as a base station. Referring to FIG. 13, a message is received 1301 from a terminal device (UE), wherein the message comprises at least an indication of a direct current (DC) location associated with the terminal device. An effective channel bandwidth for uplink is determined 1302 based at least partly on the direct current location associated with the terminal device. The effective channel bandwidth for uplink may also be referred to as effective UL CBW. A maximum number of uplink resource blocks for fulfilling one or more reference sensitivity requirements of the terminal device is determined 1303 based at least partly on the effective channel bandwidth and a pre-defined condition. The pre-defined condition indicates whether the maximum number of uplink resource blocks for fulfilling the one or more reference sensitivity requirements can be determined based on the effective channel bandwidth for uplink.

Figure 14:
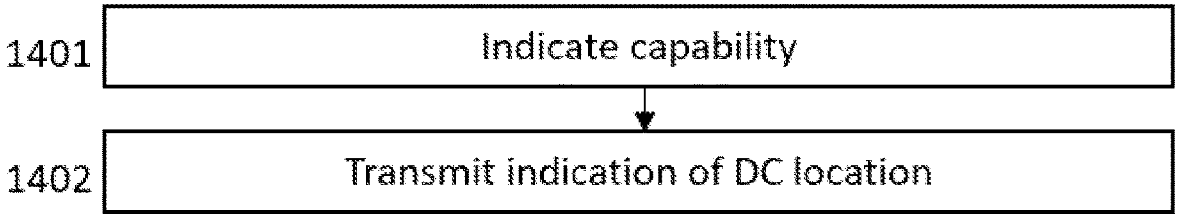

FIG. 14 illustrates a flow chart according to an exemplary embodiment. The functions illustrated in FIG. 14 may be performed by an apparatus such as, or comprised in, a terminal device (UE). Referring to FIG. 14, a capability for fulfilling one or more reference sensitivity requirements based at least partly on a pre-defined condition is indicated 1401 to a network element of a wireless communication network by transmitting a first message. The first message comprising the capability indication may be transmitted directly to the network element, or the first message may be transmitted to another network node, and the network element may then obtain the capability information from the other network node. The pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current (DC) location associated with the terminal device. A second message comprising at least an indication of the direct current location associated with the terminal device is transmitted 1402 to the network element.

The functions and/or blocks described above by means of FIGS. 10-14 are in no absolute chronological order, and some of them may be performed simultaneously or in an order differing from the described one. Other functions and/or blocks may also be executed between them or within them.

A technical advantage provided by some exemplary embodiments is that they may enable the network to improve UL resource allocation as well as DL resource allocation considering both UL BWP and DL BWP. For example, if the pre-defined condition is fulfilled, then the network may increase the number of UL RBs allocated to the UE in comparison the maximum number defined in the current specifications (e.g. Table 2) without degrading the REFSENS at the UE. Hence, some exemplary embodiments may improve both UL capacity and DL capacity as well as coverage.

Example signaling for reporting the UE capability for different capability possibilities are presented in the following.

For example, the UE may indicate the improved REFSENS capability described above as a generic capability for all bands and band combinations. Based on the capability indication, the network can obtain information on whether or not the capability is applied from the UE via DC location reporting with (FIG. 12) or without (FIG. 11) the optional network request in the DC location request. This generic capability can be reported for example as follows (with the field improvedRefSens-r17):

```
RF-Parameters ::=                          SEQUENCE {
  supportedBandListNR                        SEQUENCE
(SIZE (1..maxBands)) OF BandNR,
  supportedBandCombinationList
BandCombinationList                      OPTIONAL,
  appliedFreqBandListFilter                  FreqBandList
OPTIONAL,
  ...,
--<UNNECESSARY PARTS OMITTED>
  [[
  improvedRefSens-r17              ENUMERATED { supported}
OPTIONAL
  ]]
}
```

Alternatively, the UE may indicate a per-band capability, which is applicable for all band combinations (BCs) where this band appears. Per-band capability (i.e. UE indicating supported bands for the feature, independent of band combination) may be reported for example as follows:

```
BandNR ::=                    SEQUENCE {
  bandNR                        FreqBandIndicatorNR,
  ...,
--<UNNECESSARY PARTS OMITTED>
  [[
  improvedRefSens-r17              ENUMERATED { supported}
OPTIONAL
  ]]
```

Per-BC and per-band-per-BC capability (i.e. UE indicating support for each band of each BC) may be reported for example as follows (wherein the included information within a given BC depends on the option chosen and is illustrated afterwards):

```
RF-Parameters ::=                                SEQUENCE {
  supportedBandListNR                              SEQUENCE
(SIZE (1..maxBands)) OF BandNR,
  supportedBandCombinationList
BandCombinationList                            OPTIONAL,
  appliedFreqBandListFilter                        FreqBandList
OPTIONAL,
--<UNNECESSARY PARTS OMITTED>
  ...,
--<UNNECESSARY PARTS OMITTED>
  [[
  supportedBandCombinationList-v17xy
BandCombinationList-v17xy                      OPTIONAL
  ]]
}
BandCombinationList-v17xy ::=              SEQUENCE (SIZE
                                           (1..maxBandComb))
OF BandCombination-v17xy
```

Per-BC capability (i.e. UE indicating the capability for a given BC, thus applicable for all bands in a certain BC) may be reported for example as follows (within the structure illustrated above):

```
BandCombination-v17xy::=      SEQUENCE {
  improvedRefSens-r17            ENUMERATED {supported}
OPTIONAL
}
```

Per-band-per-BC capability (i.e. applicable for a certain band in a certain BC) may be reported for example as follows (within the structure illustrated above):

```
BandCombination-v17xy::=           SEQUENCE {
   bandList-v17xy                     SEQUENCE (SIZE
(1..maxSimultaneousBands)) OF BandParameters-v17xy
}
BandParameters-v17xy ::=          SEQUENCE {
   improvedRefSens-r17                    ENUMERATED {supported}
OPTIONAL
}
```

The DC location request, including the optional network request (reportCalculatedRefSens-r17), may be signaled from the network to the UE for example as follows:

```
-- Configuration of one Cell-Group:
CellGroupConfig ::=                        SEQUENCE {
   cellGroupId                               CellGroupId,
   rlc-BearerToAddModList                    SEQUENCE
(SIZE(1..maxLC-ID)) OF RLC-BearerConfig
OPTIONAL,   -- Need N
   rlc-BearerToReleaseList                   SEQUENCE
(SIZE(1..maxLC-ID)) OF LogicalChannelIdentity
OPTIONAL,   -- Need N
   mac-CellGroupConfig                       MAC-CellGroupConfig
OPTIONAL,   -- Need M
   physicalCellGroupConfig
PhysicalCellGroupConfig
OPTIONAL,   -- Need M
   spCellConfig                              SpCellConfig
OPTIONAL, - Need M
   sCellToAddModList                         SEQUENCE (SIZE
(1..maxNrofSCells)) OF SCellConfig              OPTIONAL,
-- Need N
   sCellToReleaseList                        SEQUENCE (SIZE
(1..maxNrofSCells)) OF SCellIndex               OPTIONAL,
-- Need N
   ...,
--<UNNECESSARY PARTS OMITTED>
   [[
   reportCalculatedRefSens-r17    ENUMERATED {true}
OPTIONAL    -- Need N
   ]]
}
```

In the following example, the UE indicates in the DC location report whether the UE reference sensitivity can be calculated based on the DC location and applied channel bandwidth when using this UL BWP via the presence of the calculatedRefSens-r17 field (i.e. the network knows that if the UE is capable of the improvedRefSens-r17, the presence of this field signifies that the calculation is applied, and absence of this field signifies that it is not applied):

```
UplinkTxDirectCurrentList ::=            SEQUENCE (SIZE
(1..maxNrofServingCells)) OF UplinkTxDirectCurrentCell
UplinkTxDirectCurrentCell ::=            SEQUENCE {
   servCellIndex                           ServCellIndex,
   uplinkDirectCurrentBWP                  SEQUENCE (SIZE
(1..maxNrofBWPs)) OF UplinkTxDirectCurrentBWP,
   ...,
   [[
   uplinkDirectCurrentBWP-SUL              SEQUENCE (SIZE
(1..maxNrofBWPs)) OF UplinkTxDirectCurrentBWP       OPTIONAL
   ]],
   [[
   calculatedRefSens-r17                ENUMERATED     OPTIONAL
                                        {true}
   ]]
}
UplinkTxDirectCurrentBWP ::=             SEQUENCE {
   bwp-Id                                  BWP-Id,
   shift7dot5kHz                           BOOLEAN,
   txDirectCurrentLocation                 INTEGER (0..3301)
}
```

Table 5 below includes the UplinkTxDirectCurrentCell field descriptions.

TABLE 5

| UplinkTxDirectCurrentCell field descriptions | |
|---|---|
| calculatedRefSens | Indicates whether UE reference sensitivity can be calculated based on the DC location and applied channel bandwidth when using this UL BWP. |
| servCellIndex | The serving cell identifier of the serving cell corresponding to the uplinkDirectCurrentBWP. |
| uplinkDirectCurrentBWP | The TX DC locations for all the uplink BWPs configured at the corresponding serving cell. |
| uplinkDirectCurrentBWP-SUL | The TX DC locations for all the supplementary uplink BWPs configured at the corresponding serving cell. |

Figure 15:
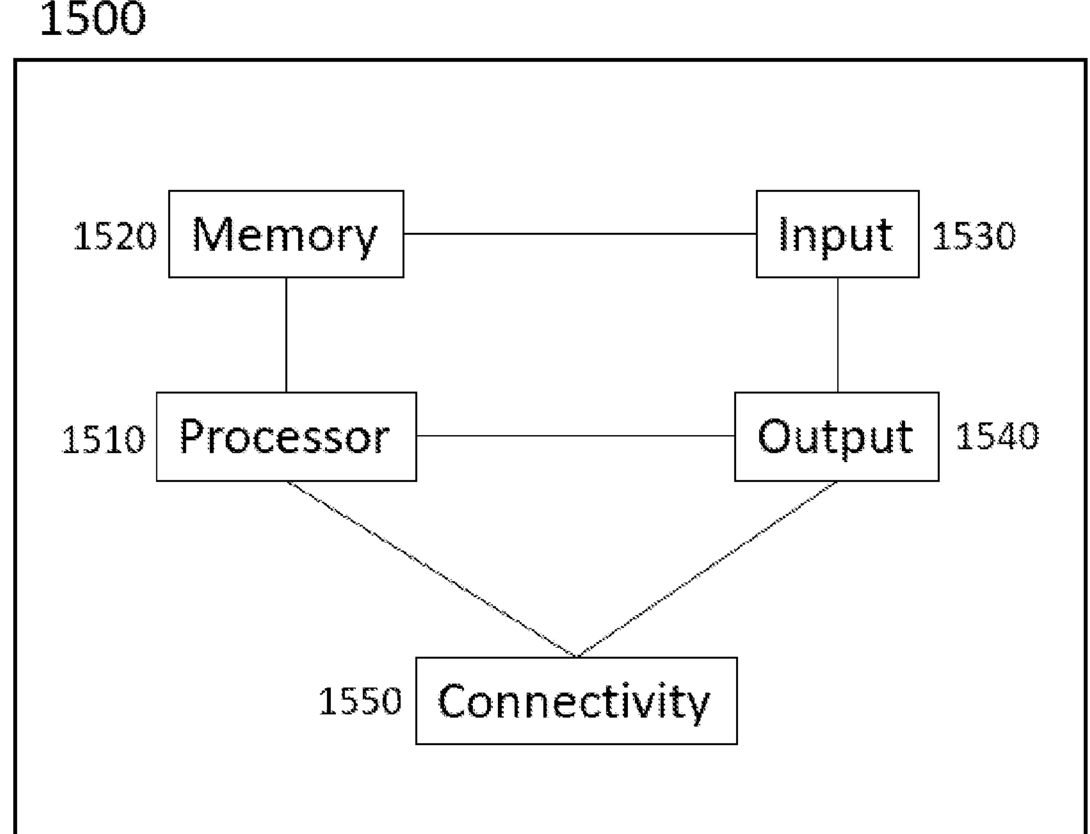
FIGS. 15-16 illustrate apparatuses according to some exemplary embodiments.

FIG. 15 illustrates an apparatus 1500, which may be an apparatus such as, or comprised in, a terminal device, according to an exemplary embodiment. A terminal device may also be referred to as a UE or user equipment herein. The apparatus 1500 comprises a processor 1510. The processor 1510 interprets computer program instructions and processes data. The processor 1510 may comprise one or more programmable processors. The processor 1510 may comprise programmable hardware with embedded firmware and may, alternatively or additionally, comprise one or more application-specific integrated circuits (ASICs).

The processor 1510 is coupled to a memory 1520. The processor is configured to read and write data to and from the memory 1520. The memory 1520 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1520 stores computer readable instructions that are executed by the processor 1510. For example, non-volatile memory stores the computer readable instructions and the processor 1510 executes the instructions using volatile memory for temporary storage of data and/or instructions.

The computer readable instructions may have been pre-stored to the memory 1520 or, alternatively or additionally, they may be received, by the apparatus, via an electromagnetic carrier signal and/or may be copied from a physical entity such as a computer program product. Execution of the computer readable instructions causes the apparatus 1500 to perform one or more of the functionalities described above.

In the context of this document, a "memory" or "computer-readable media" or "computer-readable medium" may be any non-transitory media or medium or means that can contain, store, communicate, propagate or transport the instructions for use by or in connection with an instruction execution system, apparatus, or device, such as a computer.

The apparatus 1500 may further comprise, or be connected to, an input unit 1530. The input unit 1530 may comprise one or more interfaces for receiving input. The one or more interfaces may comprise for example one or more temperature, motion and/or orientation sensors, one or more cameras, one or more accelerometers, one or more microphones, one or more buttons and/or one or more touch detection units. Further, the input unit 1530 may comprise an interface to which external devices may connect to.

The apparatus 1500 may also comprise an output unit 1540. The output unit may comprise or be connected to one or more displays capable of rendering visual content, such as a light emitting diode (LED) display, a liquid crystal display (LCD) and/or a liquid crystal on silicon (LCoS) display. The output unit 1540 may further comprise one or more audio outputs. The one or more audio outputs may be for example loudspeakers.

The apparatus 1500 further comprises a connectivity unit 1550. The connectivity unit 1550 enables wireless connectivity to one or more external devices. The connectivity unit 1550 comprises at least one transmitter and at least one receiver that may be integrated to the apparatus 1500 or that the apparatus 1500 may be connected to. The at least one transmitter comprises at least one transmission antenna, and the at least one receiver comprises at least one receiving antenna. The connectivity unit 1550 may comprise an integrated circuit or a set of integrated circuits that provide the wireless communication capability for the apparatus 1500. Alternatively, the wireless connectivity may be a hardwired application-specific integrated circuit (ASIC). The connectivity unit 1550 may comprise one or more components such as a power amplifier, digital front end (DFE), analog-to-digital converter (ADC), digital-to-analog converter (DAC), frequency converter, (de)modulator, and/or encoder/decoder circuitries, controlled by the corresponding controlling units.

It is to be noted that the apparatus 1500 may further comprise various components not illustrated in FIG. 15. The various components may be hardware components and/or software components.

Figure 16:
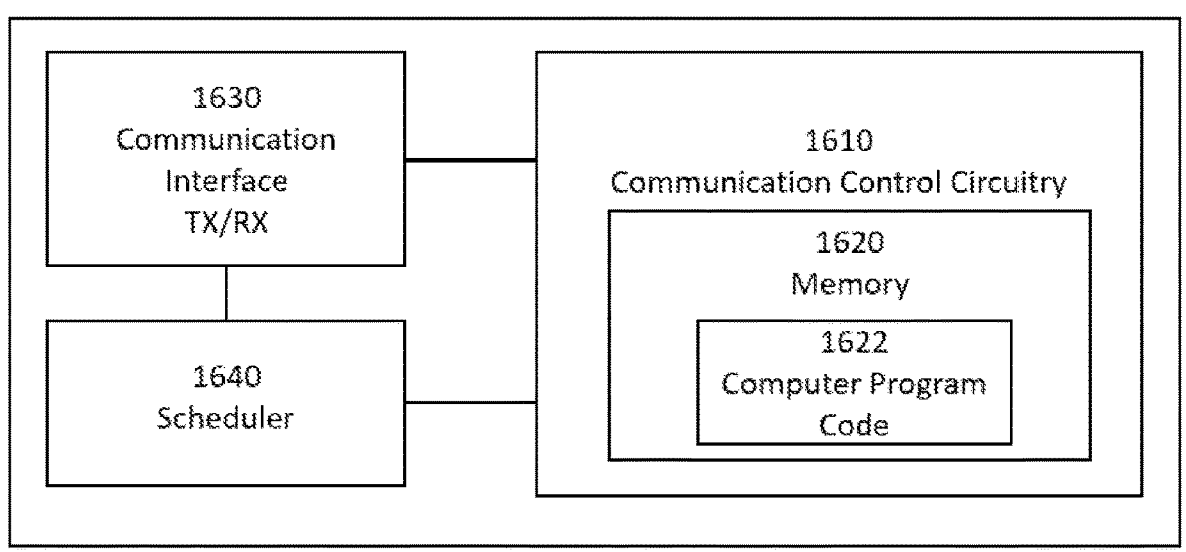

The apparatus 1600 of FIG. 16 illustrates an exemplary embodiment of an apparatus such as, or comprised in, a base station. The base station may be referred to, for example, as a network element, a nodeB, an LTE evolved nodeB (eNB), a gNB, an NR base station, a 5G base station, an access point (AP), a distributed unit (DU), a central unit (CU), a baseband unit (BBU), a radio unit (RU), a radio head, a remote radio head (RRH), or a transmission and reception point (TRP). The apparatus may comprise, for example, a circuitry or a chipset applicable to a base station for realizing some of the described exemplary embodiments. The apparatus 1600 may be an electronic device comprising one or more electronic circuitries. The apparatus 1600 may comprise a communication control circuitry 1610 such as at least one processor, and at least one memory 1620 including a computer program code (software) 1622 wherein the at least one memory and the computer program code (software) 1622 are configured, with the at least one processor, to cause the apparatus 1600 to carry out some of the exemplary embodiments described above.

The processor is coupled to the memory 1620. The processor is configured to read and write data to and from the memory 1620. The memory 1620 may comprise one or more memory units. The memory units may be volatile or non-volatile. It is to be noted that in some exemplary embodiments there may be one or more units of non-volatile memory and one or more units of volatile memory or, alternatively, one or more units of non-volatile memory, or, alternatively, one or more units of volatile memory. Volatile memory may be for example random-access memory (RAM), dynamic random-access memory (DRAM) or synchronous dynamic random-access memory (SDRAM). Non-volatile memory may be for example read-only memory (ROM), programmable read-only memory (PROM), electronically erasable programmable read-only memory (EEPROM), flash memory, optical storage or magnetic storage. In general, memories may be referred to as non-transitory computer readable media. The memory 1620 stores computer readable instructions that are executed by the processor. For example, non-volatile memory stores the computer readable instructions and the processor executes the instructions using volatile memory for temporary storage of data and/or instructions.

The computer readable instructions may have been prestored to the memory 1620 or, alternatively or additionally, they may be received, by the apparatus, via an electromagnetic carrier signal and/or may be copied from a physical entity such as a computer program product. Execution of the computer readable instructions causes the apparatus 1600 to perform one or more of the functionalities described above.

The memory 1620 may be implemented using any suitable data storage technology, such as semiconductor-based memory devices, flash memory, magnetic memory devices and systems, optical memory devices and systems, fixed memory and/or removable memory. The memory may comprise a configuration database for storing configuration data. For example, the configuration database may store a current neighbour cell list, and, in some exemplary embodiments, structures of the frames used in the detected neighbour cells.

The apparatus 1600 may further comprise a communication interface 1630 comprising hardware and/or software for realizing communication connectivity according to one or more communication protocols. The communication interface 1630 comprises at least one transmitter (TX) and at least one receiver (RX) that may be integrated to the apparatus 1600 or that the apparatus 1600 may be connected to. The communication interface 1630 provides the apparatus with radio communication capabilities to communicate in the cellular communication system. The communication interface may, for example, provide a radio interface to terminal devices. The apparatus 1600 may further comprise another interface towards a core network such as the network coordinator apparatus and/or to the access nodes of the cellular communication system. The apparatus 1600 may further comprise a scheduler 1640 that is configured to allocate resources.

As used in this application, the term "circuitry" may refer to one or more or all of the following: a) hardware-only circuit implementations (such as implementations in only analog and/or digital circuitry); and b) combinations of hardware circuits and software, such as (as applicable): i) a combination of analog and/or digital hardware circuit(s) with software/firmware and ii) any portions of hardware processor(s) with software (including digital signal processor(s)), software, and memory(ies) that work together to cause an apparatus, such as a mobile phone, to perform various functions); and c) hardware circuit(s) and/or processor(s), such as a microprocessor(s) or a portion of a microprocessor(s), that requires software (for example firmware) for operation, but the software may not be present when it is not needed for operation.

This definition of circuitry applies to all uses of this term in this application, including in any claims. As a further example, as used in this application, the term circuitry also covers an implementation of merely a hardware circuit or processor (or multiple processors) or portion of a hardware circuit or processor and its (or their) accompanying software and/or firmware. The term circuitry also covers, for example and if applicable to the particular claim element, a baseband integrated circuit or processor integrated circuit for a mobile device or a similar integrated circuit in server, a cellular network device, or other computing or network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of exemplary embodiments may be implemented within one or more application-specific integrated circuits (ASICs), digital signal processors (DSPs), digital signal processing devices (DSPDs), programmable logic devices (PLDs), field programmable gate arrays (FPGAs), graphics processing units (GPUs), processors, controllers, micro-controllers, microprocessors, other electronic units designed to perform the functions described herein, or a combination thereof. For firmware or software, the implementation can be carried out through modules of at least one chipset (for example procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

It will be obvious to a person skilled in the art that, as technology advances, the inventive concept may be implemented in various ways. The embodiments are not limited to the exemplary embodiments described above, but may vary within the scope of the claims. Therefore, all words and expressions should be interpreted broadly, and they are intended to illustrate, not to restrict, the exemplary embodiments.

The invention claimed is:

1. An apparatus comprising at least one processor, and at least one memory including computer program code, wherein the at least one memory and the computer program code are configured, with the at least one processor, to cause the apparatus to:

receive, from a terminal device, a message comprising at least an indication of a direct current location associated with the terminal device;

determine an effective channel bandwidth for uplink based at least partly on the direct current location associated with the terminal device;

determine a first separation distance between two closest edges of the effective channel bandwidth and a downlink channel bandwidth or a downlink bandwidth part;

determine a second separation distance between two closest edges of an uplink channel bandwidth and the downlink channel bandwidth;

determine whether a pre-defined condition is fulfilled by comparing the first separation distance and the second separation distance; and determine, based at least partly on the effective channel bandwidth and the pre-defined condition, a maximum number of uplink resource blocks for fulfilling one or more reference sensitivity requirements of the terminal device.

2. An apparatus according to claim 1, wherein the apparatus is further caused to:

obtain information indicating a capability of the terminal device for fulfilling the one or more reference sensitivity requirements based at least partly on the pre-defined condition;

wherein the pre-defined condition indicates whether the maximum number of uplink resource blocks can be determined based on the effective channel bandwidth.

3. An apparatus according to claim 2, wherein the apparatus is further caused to:

transmit, to the terminal device, a request for indicating whether or not the capability is applied.

4. An apparatus according to claim 2, wherein the apparatus is further caused to:

receive, from the terminal device, an indication indicating that the capability is applied.

5. An apparatus according to claim 4, wherein the indication that the capability is applied is received in the message comprising the indication of the direct current location.

6. An apparatus according to claim 1, wherein the effective channel bandwidth for uplink is determined by:

selecting a longest distance among a first distance between the direct current location and a lower edge of an uplink bandwidth part, and a second distance between the direct current location and a higher edge of the uplink bandwidth part;

selecting a channel bandwidth that is greater than or equal to the longest distance multiplied by two; and if the selected channel bandwidth is within a frequency band or a frequency band combination used by the terminal device, determining the effective channel bandwidth based on the selected channel bandwidth.

7. An apparatus according to claim 6, wherein the selected channel bandwidth is smallest among one or more supported channel bandwidths greater than or equal to the longest distance multiplied by two.

8. An apparatus according to claim 1, wherein the pre-defined condition is fulfilled, if the first separation distance is larger than or equal to the second separation distance;

wherein the maximum number of uplink resource blocks is determined based on the effective channel bandwidth, if the pre-defined condition is fulfilled.

9. An apparatus comprising at least one processor, and at least one memory including computer program code, wherein the at least one memory and the computer program code are configured, with the at least one processor, to cause the apparatus to:

indicate, to a network element of a wireless communication network, a capability for fulfilling one or more reference sensitivity requirements based at least partly on a pre-defined condition, wherein the capability is indicated by transmitting a first message;

wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location;

wherein the pre-defined condition is evaluated by comparing a first separation distance between two closest edges of the effective channel bandwidth and a downlink channel bandwidth or a downlink bandwidth part with a second separation distance between two closest edges of an uplink channel bandwidth and the downlink channel bandwidth; and transmit, to the network element, a second message comprising at least an indication of the direct current location.

10. An apparatus according to claim 9, wherein the apparatus is further caused to: receive, from the network element, a request for indicating whether or not the capability is applied.

11. An apparatus according to claim 9, wherein the apparatus is further caused to:

transmit, to the network element, an indication indicating that the capability is applied.

12. An apparatus according to claim 11, wherein the indication that the capability is applied is comprised in the second message.

13. An apparatus according to claim 9, wherein the apparatus is further caused to:

receive, from the network element, in response to transmitting the second message, a third message indicating a number of allocated resource blocks.

14. An apparatus according to claim 9, wherein the pre-defined condition indicates to compare a first separation distance between two closest edges of the effective channel bandwidth and a downlink channel bandwidth or a downlink bandwidth part, and a second separation distance between two closest edges of an uplink channel bandwidth and the downlink channel bandwidth.

15. An apparatus according to claim 14, wherein the pre-defined condition is fulfilled, if the first separation distance is larger than or equal to the second separation distance.

16. An apparatus according to claim 14, wherein the pre-defined condition is not fulfilled, if the first separation distance is less than the second separation distance.

17. An apparatus according to claim 9, wherein the apparatus is comprised in a terminal device.

18. A method comprising:

indicating, to a network element of a wireless communication network, a capability for fulfilling one or more reference sensitivity requirements based at least partly on a pre-defined condition, wherein the capability is indicated by transmitting a first message;

wherein the pre-defined condition indicates whether a maximum number of uplink resource blocks for fulfilling the one or more reference sensitivity requirements can be determined based on an effective channel bandwidth for uplink, wherein the effective channel bandwidth is based at least partly on a direct current location;

wherein the pre-defined condition is evaluated by comparing a first separation distance between two closest edges of the effective channel bandwidth and a downlink channel bandwidth or a downlink bandwidth part with a second separation distance between two closest edges of an uplink channel bandwidth and the downlink channel bandwidth; and transmitting, to the network element, a second message comprising at least an indication of the direct current location.

* * * * *